US011489940B2

(12) United States Patent
Vijayashekar et al.

(10) Patent No.: US 11,489,940 B2
(45) Date of Patent: Nov. 1, 2022

(54) DATA PROCESSING SYSTEMS

(71) Applicant: Arm Limited, Cambridge (GB)

(72) Inventors: Akshay Vijayashekar, Trondheim (NO); Jussi Tuomas Pennala, Oulu (FI); Georgios Passas, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/649,153

(22) Filed: Jan. 27, 2022

(65) Prior Publication Data
US 2022/0239755 A1 Jul. 28, 2022

(30) Foreign Application Priority Data

Jan. 28, 2021 (EP) ..................................... 21386006
Mar. 12, 2021 (GB) ..................................... 2103476

(51) Int. Cl.
*H04L 67/568* (2022.01)
*H04L 67/1097* (2022.01)
*H04L 12/18* (2006.01)
*H04L 65/611* (2022.01)

(52) U.S. Cl.
CPC .......... *H04L 67/568* (2022.05); *H04L 12/185* (2013.01); *H04L 65/611* (2022.05); *H04L 67/1097* (2013.01)

(58) Field of Classification Search
CPC ... H04L 67/568; H04L 65/611; H04L 12/185; H04L 67/1097
See application file for complete search history.

(56) References Cited

U.S. PATENT DOCUMENTS

| 6,871,264 | B2 | 3/2005 | Soltis, Jr. | |
|---|---|---|---|---|
| 10,250,709 | B2* | 4/2019 | de los Reyes Darias | ................... H04L 67/568 |
| 10,732,982 | B2* | 8/2020 | Pennala | ............... G06F 9/5083 |
| 2006/0271743 | A1 | 11/2006 | Clark | |
| 2016/0323407 | A1* | 11/2016 | de los Reyes Darias | ................... H04L 12/5691 |
| 2017/0228317 | A1* | 8/2017 | Drapala | ............... G06F 12/0824 |

(Continued)

FOREIGN PATENT DOCUMENTS

| CN | 105095109 B | 7/2018 | |
|---|---|---|---|
| GB | 2538054 A * | 11/2016 | ......... G06F 12/0808 |

OTHER PUBLICATIONS

Search Report dated Oct. 19, 2021, GB Patent Application No. 2103476.4.

*Primary Examiner* — Shean Tokuta
(74) *Attorney, Agent, or Firm* — Vierra Magen Marcus LLP

(57) ABSTRACT

A data processing system comprising a plurality of processing units that are configurable as different partitions of processing units. The system comprises a multicast communication network for routing cache communications within a partition of processing unit. A cache controller of one of the processing units within a partition is configurable as a master cache controller for a set of caches within the partition. The master cache controller is operable to issue requests over the multicast communication network to all of the caches in the set of caches at the same time. The multicast communication network is configured to combine response signals from the different processing units within the partition to provide a combined response signal to the master cache controller that represents an overall request-response status for the caches to which the request was issued.

20 Claims, 12 Drawing Sheets

(56) References Cited

U.S. PATENT DOCUMENTS

| | | |
|---|---|---|
| 2017/0236244 A1 | 8/2017 | Price |
| 2019/0042342 A1* | 2/2019 | Guthrie .............. G06F 11/0793 |
| 2019/0056955 A1* | 2/2019 | Pennala ............... G06F 9/5077 |
| 2019/0258251 A1* | 8/2019 | Ditty ..................... G06V 20/58 |
| 2020/0293445 A1* | 9/2020 | Ibrahim ............. G06F 12/0851 |

* cited by examiner

DATA PROCESSING SYSTEMS

CROSS-REFERENCE TO RELATED APPLICATIONS

This application claims priority pursuant to 35 U.S.C. 119(a) to European Patent Application No. 21386006.7, filed Jan. 28, 2021, and United Kingdom Patent Application No. 2103476.4, filed Mar. 12, 2021, which applications are incorporated herein by reference in their entirety.

BACKGROUND

The technology described herein relates to data processing systems and in particular to data processing systems that comprise plural processing units, such as plural graphics processing units (processors) (GPUs).

It is becoming increasingly common for data processing systems to require, e.g., graphics processing operations for multiple isolated sub-systems. For example, vehicles may have a display screen for the main instrument console, an additional navigation and/or entertainment screen, and an advanced driver assistance system (ADAS). Each of these systems may require their own graphics processing operations to be performed, and it may be necessary, e.g. for formal safety requirements, for them to be able to operate independently of each other.

One approach to such systems would be to provide a single graphics processing unit (GPU) that is time shared between the different graphics processing functions that are required. However, time sharing alone may not be able to provide sufficient independence and isolation between the different sub-systems that may require graphics processing.

Alternatively, a completely separate graphics processing unit could be provided for each graphics processing function that is required. However, this may have negative implications, e.g. in terms of the number of processing components and/or cost required, as it would require the division of resources to be fixed at SoC (system on chip) creation time.

The Applicants believe therefore that there remains scope for improvements to data processing systems where the provision of plural independent data processing functions, such as graphics processing functions for plural different displays, is required.

BRIEF DESCRIPTION OF THE DRAWINGS

Embodiments of the technology described herein will now be described by way of example only and with reference to the accompanying drawings, in which.

Like reference numerals are used for like features throughout the drawings, where appropriate.

DETAILED DESCRIPTION

Figure 1:
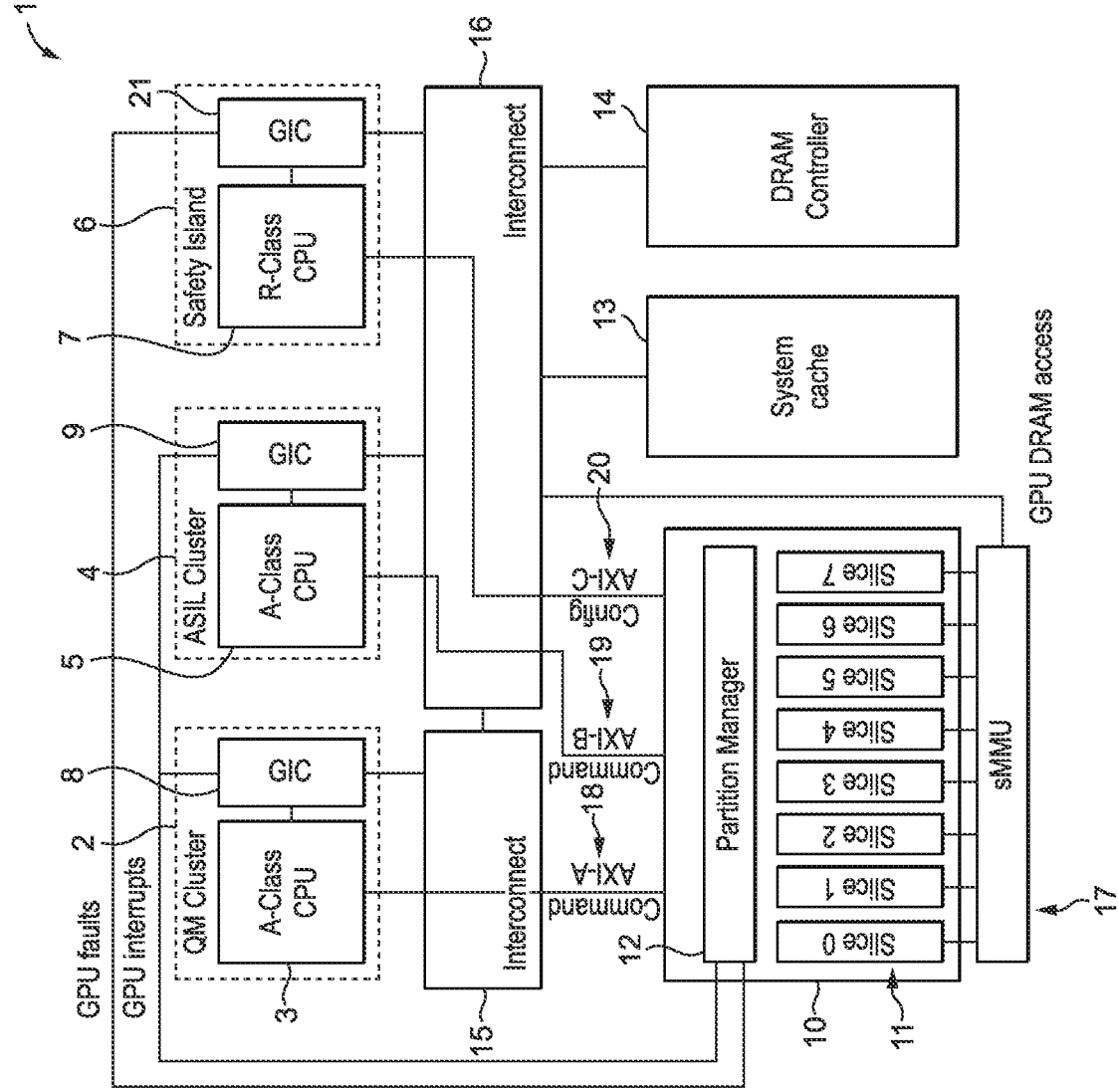
FIG. 1 shows schematically a data processing system according to an embodiment.

A first embodiment of the technology described herein comprises a data processing system comprising:

a plurality of processing units that are configurable as different, respective partitions of processing units, with each partition comprising a set of one or more of the processing units of the plurality of processing units, wherein at least some of the plurality of processing units include one or more caches and a respective cache controller; and a configurable multicast communication network for routing cache communications to and from plural caches within respective partitions of processing units, wherein the multicast communication network is configurable such that a cache controller of one of the processing units within a respective partition of plural processing units can be configured as a "master" cache controller for a set of plural caches within the partition, wherein the master cache controller is operable to issue requests over the multicast communication network to all of the caches in the set of plural caches within the partition at the same time, and wherein the multicast communication network is configured to combine respective responses from all of the caches to which a request was issued from a processing unit in the partition to generate a respective response signal for the processing unit, the multicast communication network being further configured to combine respective response signals from different processing units within the partition and to provide a combined response signal to the master cache controller that represents an overall request-response status for all of the caches in the set of plural caches to which the request was issued.

A second embodiment of the technology described herein comprises a method of operating a data processing system, the data processing system comprising:

a plurality of processing units that are configurable as different, respective partitions of processing units, with each partition comprising a set of one or more of the processing units of the plurality of processing units, wherein at least some of the plurality of processing units include one or more caches and a respective cache controller;

wherein a multicast communication network is provided for routing cache communications to and from plural caches within a partition of processing units, the multicast communication network being configured such that a cache controller of one of the processing units within a partition can be configured as a "master" cache controller for a set of plural caches within the partition:

the method comprising:

for a respective partition of plural processing units:

a master cache controller for the partition issuing a request over the multicast communication network to all of the caches in the set of plural caches within the partition at the same time;

the multicast communication network combining respective responses from all of the caches to which a request was issued from a processing unit in the partition to generate a respective response signal for the processing unit;

the multicast communication network further combining respective response signals from different processing units within the partition and providing a combined response signal to the master cache controller; and the master cache controller determining using the combined response signal an overall request-response status for all of the caches in the set of plural caches to which the request was issued.

The technology described herein relates to a data processing system that includes a plurality of processing units (e.g. graphics processing units). The processing units in the group of plural processing units are themselves able to be configured into respective "partitions" of processing units within the group, with each partition comprising a set or subset of one or more of the processing units of the group, and with at least some of the partitions (in an embodiment) comprising plural processing units of the group.

In this way, the processing units within the group can be organised into different, respective partitions of processing units, e.g. in a flexible and adaptable manner. For example, rather than fixing the organisation of the processing units at the time when the system is fabricated, a controller (e.g. software arbiter) for the group is able to configure the allocation and organisation of processing units into different partitions as desired, and, e.g., and in an embodiment, then vary that allocation, e.g. in use.

A benefit of this is that the processing resource of the plurality of processing units within the group can thus be dynamically partitioned, which may therefore provide a more flexible, 'configurable' data processing system.

For example, and in an embodiment, the data processing system may comprise a group of plural substantially similar, e.g., and in an embodiment, functionally equivalent, in an embodiment identical, processing units. The processing units within the group can then be flexibly configured, and in an embodiment re-configured, as desired, as different partitions of the processing units, e.g. according to the current processing requirements.

As will be discussed further below, this then means that the data processing system of the technology described herein can provide a system in which a "pool" of processing units can be flexibly and adaptably allocated both between, e.g., safety critical and non-safety critical domains, and to virtual machines to provide processing functions for those virtual machines, whilst supporting, e.g., and in an embodiment, both safety critical and non-safety critical operations, and in an efficient manner.

The processing units within a partition may operate in combination to generate a data processing output, e.g., and in an embodiment, in a "master-slave"-type arrangement, as will be explained further below. During a processing operation using the partition, various different types of communication signals may therefore desirably be passed between processing units.

To achieve this the processing units within a partition are thus in an embodiment connected to each other via communication bridges such that they can communicate with each other. Each processing unit may therefore, and in an embodiment does, have a set of corresponding communication interfaces allowing the processing unit to be connected to the other processing units in a partition.

The communication bridges between processing units within a partition, together with the internal communication networks (e.g. interconnects) within each processing unit in the partition, may thus define various communication networks for routing different types of communications between the processing units within the partition. The processing units are thus configurable to collectively form a communication network that allows communications to be routed between the processing units within a respective partition of processing units.

The technology described herein is particularly concerned with, and relates to, a communication network for routing "multicast" cache communications to and from a set of plural caches within such data processing systems that include a plurality of processing units that can be configured as different partitions of processing units.

For instance, in the technology described herein, at least some of the plurality of processing units, and in an embodiment each of the processing units, include a respective one or more caches, such that a respective partition of plural processing units may include a corresponding set of plural caches made up of the one or more caches of the processing units within the partition. The set of plural caches that are operated according to the technology described herein, e.g., and to which multicast communications can be issued, may thus generally be distributed across different processing units within the partition, e.g. with the number and arrangement of caches within the partition depending on the configuration of the set or subset of processing units within the respective partition.

The 'multicast' cache communication network of the technology described herein can be provided in any suitable manner, as desired. For example, in an embodiment, each processing unit within a partition has its own internal multicast cache communication network (which may be dedicated for multicast cache communications). When a plurality of processing units are configured as a respective partition, the multicast cache communication network may thus be formed from the respective internal multicast cache communication networks together with appropriate communication bridges interconnecting the different (e.g. logically adjacent) processing units within the partition. The processing units within a partition can thus be configured (logically) to collectively form a multicast communication network that allows multicast cache communications to be routed to and from the processing units within the partition appropriately.

As will be discussed further below, the present Applicants recognise that at some times during a processing operation that is using a respective partition of processing units, it may be desirable to issue a request at the same time to all of the caches in a set of plural caches within the partition (e.g. in a "multicast" fashion).

In this regard, the present Applicants have recognised that in the context of such data processing systems that include a plurality of processing units that can be configured as different respective partitions of processing units, the cache communication network should desirably be able to allow such multicast cache communications to be issued across multiple different processing units within a partition (which processing units within a given partition may, e.g., and in an embodiment do, operate in different (independent) clock domains), e.g., and in an embodiment, in an efficient manner.

The Applicants have further recognised that in order to achieve the desired overall flexibility and adaptability of the data processing system, e.g. as described above, the multicast cache communication network should desirably also be able to accommodate the different possible partitions (configurations) of the plurality of processing units, which different partitions may, e.g., include different numbers and arrangements of caches, e.g. depending on the set or subset of processing units within the partition.

These requirements can be addressed by the multicast cache communication network of the data processing system of the technology described herein.

In particular, and to this end, the technology described herein provides a multicast communication network for routing cache communications to and from a plurality of caches that is configurable such that a cache controller of one of the processing units within a respective partition of plural processing units can be configured as a "master" cache controller for a set of plural caches within the partition.

The cache communication network for the respective partition of plural processing units is then configured such that the designated master cache controller is operable to issue requests to all of the caches in the set of plural caches within the partition at the same time. Any responses to such requests from the caches in the set of plural caches to which the request was issued can then be (and are) provided back to the master cache controller via the multicast communication network.

In the technology described herein the multicast cache communication network is configured to combine responses from all of the caches from a processing unit to which the request was issued, to thereby generate an overall response signal for the processing unit as a whole. As will be explained further below, a combined response signal is in an embodiment generated for each processing unit, and the response signals for multiple processing units in a partition are themselves combined, e.g., and in an embodiment, in sequence, to provide an overall combined response signal for the (entire) set of plural caches to which a request was issued.

The multicast cache communication network of the technology described herein is thus operable to provide a "combined" cache response signal to the master cache controller that indicates the overall request-response status for all of the caches in the set of plural caches to which a request was issued.

For instance, the master cache controller may receive a (first) combined response signal indicating that/when all of the caches in the set of plural caches to which a request was issued have received and acknowledged the request (the overall request-response status thus being that all of the caches have received and are responding to the request).

In that case, the master cache controller may thus determine that all of the caches have received the request signal, and, e.g., and in an embodiment, the master cache controller can then (subsequently) de-assert the request signal (when it is desired to do so, e.g. after the action (e.g. memory update) that triggered the request has completed).

Correspondingly, and in an embodiment, the master cache controller may (subsequently) receive a (second) combined response signal indicating that/when all of the caches in the set of plural caches to which a request was issued have received and acknowledged the de-asserted request signal (the overall request-response status thus being that all of the caches have completed the request).

In that case, the master cache controller may thus determine that all of the caches have received and acknowledged the de-asserted request. Any processing or further requests that were waiting pending the completion of the request can then continue accordingly.

In this way, the master cache controller is able to process such requests and responses at the level of the entire partition, i.e. for all of the caches in the partition, e.g. without needing to track (or to know) which of the individual caches within the set of plural caches to which the request was issued have received/completed the request. This in turn means that the master cache controller need not necessarily know how many caches are in the set, or how the caches in the set are distributed across the processing units within the partition.

As will be explained further below, this arrangement may therefore be particularly suitable for use with data processing systems of the type described above including a plurality of processing units that can be configured as different respective partitions of processing units.

The technology described herein thus provides a cache communication network that is able to efficiently implement multicast cache communications within such data processing systems whilst maintaining the desired overall flexibility and configurability of the data processing system.

In this way, the technology described herein may therefore various benefits compared to other data processing systems.

The data processing system may comprise any desired and suitable plural number of processing units. In an embodiment, there are four or eight processing units, but the data processing system may comprise more or fewer processing units, as desired.

The processing units may be any suitable and desired form of processing unit. In an embodiment, the processing units are processing units that are intended to perform a particular form or forms of processing operation, and in particular that, in an embodiment, function as a hardware accelerator for a particular form or forms of processing operation. Thus the processing units may, for example, be any suitable and desired form of processing unit and accelerator, such as a video processing unit, a machine learning accelerator, a neural network processing unit, etc.

In an embodiment, the processing units are graphics processing units (graphics processors, GPUs). In this case, the graphics processing units of the data processing system can comprise any suitable and desired form of graphics processing unit. The graphics processing units may perform any suitable and desired form of graphics processing, such as rasterisation-based rendering, ray-tracing, hybrid ray-tracing etc.

This being the case, embodiments of the technology described herein will be described below primarily with reference to the processing units being graphics processing units. However, unless the context requires otherwise, the described features of the technology described herein can equally and analogously be applied to and used for other forms of processing unit, and the technology described herein extends to such systems using forms of processing unit other than graphics processing units.

The processing units can be used for all forms of output that data processing units may output. Thus, in the case of graphics processing units, it may be used when generating frames for display, render-to-texture outputs, etc. However, the technology described herein can equally be used where the graphics processing units are to be used to provide other processing and operations and outputs, for example that may not be or may not relate to a display or images. For example, the technology described herein can equally be used for non-graphics use cases such as ADAS (Advanced Driver Assistance Systems) which may not have a display and which may deal with input data (e.g. sensor data, such as radar data) and/or output data (e.g. vehicle control data) which isn't related to images. In general, the technology described herein can be used for any desired graphics processor data processing operations, such as GPGPU (general purpose GPU) operations.

As mentioned above, the data processing system comprises a group of plural (similar) processing units (e.g. a plurality of graphics processing units).

The individual processing units may be the same or differ from each other, e.g. in terms of their processing resources and capabilities. In embodiments each of the processing units includes substantially the same types of functional units, although there may be different numbers thereof on different processing units. In some embodiments each of the processing units in the group is substantially functional equivalent, e.g., and in an embodiment identical.

In examples of such embodiment, at least some of the processing units can operate in combination with at least one other processing unit of the plurality of processing units to generate a data processing output, with some, and in an embodiment all, of the processing units also being operable to generate a data processing output on their own (i.e. independently of any other processing unit of the plurality of processing units).

The processing units are themselves partitionable into one or more sets ("partitions") of one or more processing units, wherein each set (partition) of one or more processing units is operable to generate a data processing output independently of any other set (partition) of one or more processing units of the one or more sets (partitions) of one or more processing units.

The processing units can in an embodiment be configured as a partition of any desired set or subset of one or more of the available processing units. That is, the plurality of processing units may be respectively partitioned according to any desired permutation of the processing units.

The processing units within a given partition may generally be organised and configured in any suitable fashion, as desired.

In an embodiment, where a processing unit is operating in combination with at least one other processing unit of the plurality of processing units to generate the same data processing output, then the processing units of the set (partition) in an embodiment operate in a "master-slave"-type arrangement, with one processing unit of the set (partition) operating as a master (primary) processing unit controlling processing operations on one or more other processing units that are each acting as a slave (secondary) processing unit.

For example, in the case where a partition comprises plural processing units, one of the processing units is in an embodiment configured as a "master" processing unit, e.g., that provides the software interface to a virtual machine for itself and its set of one or more slave processing units. This then has the advantage that to any virtual machine that is using the partition, it still appears as though there is only a single processing unit.

Thus, when a processing unit is to act as a "master" processing unit, a management unit (e.g. "job manager") for that master processing unit in an embodiment provides the software interface (e.g. to the driver for the virtual machine in question) for the linked set of master and its respective slave processing units.

Similarly, the management unit of the master processing unit is in an embodiment configured to distribute processing task processing across the master and slave processing units that it is controlling (but the arrangement is such that from the software (driver) side, there is still only a single processing unit that is being instructed and to which the processing task is being sent).

Correspondingly, when a processing unit is to operate in slave mode (as a slave processing unit under the control of another master processing unit), then the operation of the processing unit is in an embodiment configured accordingly. For example, any functional units that are redundant in a "slave" processing unit are in an embodiment made 'inactive' when a processing unit is configured to operate as a "slave".

In an embodiment, an arbiter for a group of processing units can reconfigure the allocation of processing units of the group to the respective partitions for the group in use. In this case, a given processing unit and/or partition is in an embodiment reset and/or powered off (and then restarted) when it is reconfigured. Correspondingly, if there is a virtual machine accessing a partition that is to be reconfigured, there is in an embodiment an appropriate handshaking procedure to allow the processing for that virtual machine to be appropriately stopped and suspended, before the reconfiguration takes place.

Once the processing units have been respectively configured for operation (e.g. into respective (subsets) partitions of the processing units), then virtual machines that are to use the processing units can be allowed to access the partitions of processing units of the group, to have the partitions of processing units of the group perform processing operations for the virtual machines.

The virtual machines that access a group of processing units may take any suitable and desired form. For example, a virtual machine may execute one or more applications and/or may itself be implemented by an application. The virtual machines (and e.g. applications) may run on any desired and suitable processor, such as one or more (e.g. host) processors (e.g. central processing units) of the data processing system.

The technology described herein is particularly concerned with routing multicast cache communications within partitions of processing units.

For instance, a typical data processing unit may include one or more caches, e.g., for storing data locally to the processing unit to reduce and/or speed up instances of external memory access. A respective cache controller may also be provided for the processing unit for controlling the operation of the caches, e.g. for the purposes of managing cache coherency across multiple caches, as well as handling requests from the caches for data to be fetched from external memory, etc. This is the case for at least some of the processing units in the data processing system of the technology described herein (and is in an embodiment the case for all of the processing units in the group, which are in an embodiment substantially functionally equivalent, e.g., and in an embodiment, identical).

Thus, in the technology described herein, at least some of, and in an embodiment all of, the processing units within the group of processing units include one or more caches and a respective cache controller.

In an embodiment, at least some of, and in an embodiment each of, the processing units comprise a plurality of functional units (such as but not limited to one or more execution units (e.g. shader cores), a management unit (e.g. job manager), a cache (e.g. an L2 cache) that provides an interface to external memory, a tiler unit, etc.).

At least some of the functional units may themselves comprise an address translation cache (e.g. a translation lookaside buffer (TLB)) that can be used to store recent virtual memory to physical memory address translations for use by the functional unit. For example, all memory addresses that are issued by software and operated on by the functional unit may be "virtual" memory addresses. In order to access the external physical memory, a virtual address must therefore be translated to a physical memory address.

In an embodiment the set of plural caches to which communications can be routed to and from using the multicast communication network, and that are operated in the manner of the technology described herein, comprises a set of plural address translation caches (e.g. TLBs), and the respective cache controller comprises a memory management unit (MMU), which may, e.g., be operated in the normal fashion for an MMU, e.g. to determine the respective virtual-to-physical memory address translations.

Thus, in embodiments, the (master) cache controller is a (master) memory management unit (MMU) and the set of caches which the (master) cache controller is operable to transmit multicast requests to comprises a set of (and in an embodiment the set of all of the) address translation caches (e.g. TLBs) within the functional units of the processing units within the partition.

Any references herein to a "cache" or "cache controller" may therefore in embodiments respectively refer to an "address translation cache" (such as a TLB) and a "memory management unit".

However, whilst the technology described herein may find particular utility in this context, it will be appreciated that the multicast cache communication network described herein may generally be applied to any suitable set of plural caches.

Thus, in the data processing system of the technology described herein, a respective partition of plural processing units may therefore, and typically will, include a corresponding set of plural caches (e.g. TLBs), with at least some of the caches (TLBs) in the set of plural caches residing on different processing units within the partition. In general, each respective partition of plural processing units may have a different set of plural caches that is made up of the caches from the processing units within the partition, with different partitions therefore potentially including different numbers of caches, e.g. determined by the processing units within the partition.

The Applicants have recognised that it may sometimes be desirable to be able to transmit signals to all of the caches in a set of plural caches within a partition of plural processing units (e.g. to all of the TLBs within a partition of plural processing units) at the same time, e.g. in a "multicast" fashion.

A particular example of this would be when it is desired to invalidate all of the caches within the set of plural caches within the partition. This may be the case, for example, in the case of a set of plural TLBs, where a new set of memory address mappings needs to be used. This can arise, for example, where the memory address mappings that are being accessed via the caches need to be updated, e.g. due to a memory allocation fault, and/or where new memory address mappings need to be configured for a new software workload or in response to a system reset.

In such cases, any caches with access to the external memory that is being updated should in an embodiment be 'locked' to prevent external memory access during the update, and then 'invalidated' (cleared) to ensure that any out of date cache content, e.g. memory address mappings in the case of a TLB, is cleared from the caches, such that when the lock is removed, the processing can continue using the updated cache content.

In order to do this, a cache invalidation request (signal) is in an embodiment transmitted simultaneously to all of the caches that are to be invalidated.

Thus, in embodiments, the request that is transmitted by the master cache controller to the set of plural caches within the partition comprises a request to invalidate all of the caches in the set of plural caches.

This being the case, the technology described herein will be described below primarily with reference to the case where the request that is transmitted by the master cache controller using the multicast cache communication network is a cache invalidation request.

However, unless the context requires otherwise, the described features of the technology described herein can equally and analogously be applied to and used for other forms of request that may suitably and desirably be transmitted in a multicast fashion to a plurality of caches within a partition at the same time, such as, but not limited to, cache 'clean' requests, or memory barriers to enforce ordering.

As mentioned above, in the technology described herein, at least some of the processing units, and in an embodiment each of the processing units, have a respective (local) cache controller that is operable to control an associated set of one or more caches for the processing unit.

Thus, where a partition contains only a single processing unit, the respective (local) cache controller controls the operation of the caches associated with the processing unit.

In the technology described herein, however, where a partition contains a plurality of processing units, rather than the respective cache controllers for each of the processing units in the partition individually controlling the operation of that processing unit's respective caches, e.g. as may normally be the case, e.g. when the processing units are operated independently of one another, a cache controller for one of the processing units in the partition is configured as a "master" cache controller for the partition.

The master cache controller is then operable to control a set of plural caches within the partition including caches from its own processing unit (the processing unit including the designated master cache controller) as well as caches from any other (slave) processing units within the partition. In that case the cache controller that is designated as the master cache controller is 'active' whereas the respective cache controllers on the other processing units within the partition are in an embodiment 'inactive'

The set of plural caches that is operated in the manner of the technology described herein may comprise any suitable set or subset of caches from the processing units within a respective partition. In embodiments, the set of plural caches that is operated in the manner of the technology described herein comprises the set of all of the caches of a certain type from the processing units within a partition, e.g., and in an embodiment, all of the address translation caches (TLBs) of the processing units within the partition. However, other arrangements would be possible.

Where the processing units in a partition are arranged in a "master-slave"-type configuration, as is in an embodiment the case, the master cache controller is in an embodiment a cache controller that resides on the master processing unit (and for ease of explanation the description below will primarily refer to the master cache controller as the cache controller on the master processing unit).

However, it need not necessarily be the case that the master cache controller resides at the master processing unit, e.g. as the master processing unit may in principle configure a cache controller on a slave processing unit as the master cache controller for the partition, with the master cache controller on the slave processing unit then being operated under the control of the master processing unit.

Furthermore, for some partitions of processing units, there may be multiple master processing units and/or multiple master cache controllers, e.g. with each master cache controller controlling a respective subset of caches within the partition. Various arrangements would be possible in this regard.

In the technology described herein the master cache controller is operable to issue communications to all of the caches in a set of plural caches within its respective partition at the same time. This type of communication, to a plurality of caches at the same time, may be referred to as a "multicast" (or "broadcast") communication.

It is such multicast cache communications that the technology described herein is particularly concerned with. For instance, as mentioned above, a particular example of this would be when it is desired to simultaneously invalidate multiple of, e.g. all of, the caches within a partition. However, various other examples would be possible.

When the master cache controller issues such a request to all of the caches in a set of plural caches within its respective partition, the request is thus transmitted over the multicast communication network to each of the processing units and to each of the caches in the set of plural caches that reside on each of the processing units. The (handshaking) protocol for handling such multicast requests is in an embodiment as follows.

Firstly, the master cache controller asserts a request signal (e.g., and in an embodiment, by setting the request signal high (e.g. to '1')). The high request signal is transmitted over the multicast communication network to all of the caches in the set of plural of caches.

When a cache in the set of plural caches to which the request was issued receives the high request signal, the cache processes the request (e.g. locks transactions and invalidates cache, in the cache of a cache invalidation request), and, after completing the request, the cache is in an embodiment then operable to issue an acknowledgement to the master cache controller. The cache thus returns an appropriate response signal to the request along the cache communication network to the master cache controller. For example, and in an embodiment, when a cache in the set of caches within the partition to which the request was issued receives the high request signal, a corresponding cache response signal is accordingly set high.

Similarly, when the master cache controller subsequently de-asserts the request (e.g. after all of the caches have received and completed the request, e.g. when all of the caches have been invalidated, in the case where the request is a cache invalidation request, and in an embodiment after any actions that triggered the request have completed), the request signal is in an embodiment set low (to '0'). The low request signal is then transmitted over the multicast cache communication to all of the caches in the set of plural caches, and when the low request signal is received by a cache, the respective cache response signal is in an embodiment then set low.

When a cache receives the low request signal, the cache correspondingly then processes the de-assertion request (e.g. by removing the lock), and is then able to continue with its normal operation.

The cache may thus in effect transmit a second or further signal to the master cache controller indicating that the cache is no longer responding (or in other words indicating that the cache has received, e.g., and processed, the low (de-asserted) request signal).

However, other suitable handshake protocols could be used. For example, rather than setting the signals high when the request is being asserted, as described above, the signals could instead be set low (and then set high when the signal is de-asserted). Various other arrangements would be possible.

The master cache controller can then monitor the request-response status for (all of) the caches in the set of plural caches, e.g. and act accordingly.

For instance, when it is determined by the master cache controller that a request has been acknowledged by all of the caches in the set of plural caches to which the request was issued, the master controller can subsequently de-assert the request signal (e.g., and in an embodiment, once any desired actions/updates have been performed).

Thus, when the master cache controller is operating to issue a request to all of the caches in a set of plural caches within its respective partition, the master cache controller in an embodiment asserts a corresponding request signal, and the master cache controller in an embodiment then waits until it has determined that the asserted signal has been received by all of the caches in the set of plural caches to which the request was issued before the request signal is de-asserted.

After a cache receives such a request from the master cache controller, the request should then be actioned accordingly by the cache (e.g. by invalidating its cache entries, where the request is a cache invalidation request).

Whilst the caches in the set of plural caches are completing the request, the caches are in an embodiment locked, such that any processing using the caches may have to wait until the request is completed, at which point the caches can be unlocked. For example, where the request is a cache invalidation request that is triggered by a memory update, the processing work should not use any of the cache content (e.g. memory address mappings in the case of a TLB), in case the cache content is out of date. Locking the caches whilst the request is pending therefore ensures that this does not happen.

Accordingly, after it is determined that all of the caches in the set of plural caches have received a request, the master cache controller should then wait until it is determined that all of the caches have completed the request, and are no longer responding to the request (such that it is safe to continue processing), e.g. before allowing the processing to continue, e.g. by removing any locks.

In order to monitor the status of the request, the master cache controller thus monitors the request-response status from the caches in the partition. In a more conventional data processing system this could naively be done by directly monitoring the responses from each of the individual caches, etc.

However, in the configurable data processing system of the technology described herein, the cache communication protocol desirably should be able to accommodate different partitions including different numbers of processing units, etc., such that attempting to track the responses from each of the individual caches may require a relatively complex communication network.

Thus, in the technology described herein, rather than directly monitoring responses from each of the individual caches within the set of plural caches to which a request was issued, the master cache controller monitors a combined response signal that is provided by the multicast cache communication network and that indicates an overall request-response status for all of the caches in the set of plural caches.

In the technology described herein this is done by configuring the multicast cache communication network such that respective responses from all of the caches from a (and each) processing unit in the partition to which a request was issued are combined to give a response signal for the processing unit as a whole. The multicast communication network in an embodiment then further combines the combined response signals from each processing unit, in an embodiment in sequence, such that an overall combined response signal representing the combined responses from all of the caches from all of the processing units in the partition is provided to the master cache controller, with the combined response signal representing the overall request-response status for all of the caches in the set of plural caches to which the request was transmitted (e.g. rather than the individual request-response status for any individual one of the caches in the set of plural caches to which the request was transmitted).

That is, in the technology described herein rather than trying to track which response signals are associated with which of the individual caches, the response signals for all of the caches within each processing unit are combined, and this is in an embodiment done for each processing unit in the partition, with the response signals from each processing unit themselves then being combined to give an overall combine response signal for all of the caches for all of the processing units that is then provided back to the master cache controller.

For instance, in embodiments, the processing units within a partition of plural processing units are arranged as a linear sequence of processing units (e.g. in a "daisy chain" type arrangement), e.g., and in an embodiment, such that the multicast cache communication network is arranged such that communications to and from the set of plural caches pass linearly along the sequence of processing units, e.g. such that a processing unit will (only) receive signals from the adjacent processing unit in the sequence.

Thus, in embodiments, the multicast communication network is arranged such that cache communications are routed to and from processing units in a partition of plural processing units in sequence, such that each processing unit in the partition receives signals from an adjacent processing unit in the sequence. This means that that in a given sequence of plural processing units, each processing unit will only be connected to one or two adjacent processing units (depending on its position in the sequence).

Thus, the master processing unit may only be directly connected to one of the processing units in its respective partition (the first processing unit in the sequence), with the other processing units in the partition being connected only indirectly via the intermediate processing units in the sequence.

In embodiments, the multicast cache communication network is arranged such that each processing unit in a sequence of processing units for a partition acts to combine the response signals from all of its respective caches with a corresponding combined response signal provided from an adjacent processing unit in the sequence. Thus, in embodiments, multicast communication network is configured to combine respective responses to the request from all of the caches from a processing unit to which the request was issued with a corresponding combined response signal provided by the previous, adjacent processing unit in the sequence. This is in an embodiment done at each processing unit in the sequence of processing units to thereby generate, for each processing unit, a combined response signal representing an overall request-response status for all of the caches in the processing unit as well as in any previous processing units in the sequence. The overall combined response signal from the processing unit is then provided as input to the next, adjacent processing unit in the sequence, and so on.

This means that the signals from all of the caches in each processing unit in the sequence are in an embodiment combined, in sequence, to generate an overall combined response signal that is then returned along the sequence of processing units to the master cache controller. The combined response signal that is ultimately provided to the master cache controller thus represents the overall request-response status for all of the caches from all of the processing units in the sequence of processing units.

This may be particularly beneficial in the context of the technology described herein, where the processing units are configurable as different partitions, such the master cache controller for a respective partition may have to issue and monitor such communications to and from a plurality of caches that may reside on different processing units, and may have to monitor communications with different numbers of caches in different partitions.

For example, using a combined response signal in this way avoids the need for the master cache controller when issuing such multicast requests to individually track the status for any specific cache in the set of plural caches to which the request was issued, and may therefore simplify the cache communication network, and in turn facilitate an improved flexibility of the system.

In an embodiment, each of the processing units thus contains logic for combining cache response signals from its own associated caches with cache response signals from the previous, adjacent processing unit in the sequence of processing units, and for providing a combined cache response signal to the next, adjacent processing unit in the sequence (and back to the master cache controller).

For example, in embodiments, each of the processing units contains first logic that is operable to perform an AND operation on the cache responses from the respective caches on the processing unit itself with the combined response signal received from an adjacent processing unit in the sequence. Thus, when all of the signals are high, e.g. because all of the caches are currently responding to the request (e.g., and in an embodiment, such that all of the cache response signals are set high), the AND signal will be set accordingly (e.g. set high), and the setting of the AND signal will indicate that all of the caches in the current processing unit as well as all of the caches in the previous processing units in the sequence are currently responding.

As mentioned above, this is in an embodiment done for each processing unit in the sequence, including the master processing unit, such that the master cache controller receives a first combined response signal that is effectively generated from an AND operation of all of the cache response signals from all of the caches from all of the processing units in the sequence.

The first combined response signal that is received by the master cache controller therefore indicates whether or not all of the caches are currently responding. Thus, when the first combined response signal (the AND signal) is first set, at that point, the master cache controller can determine on that basis that all of the caches have received the request, e.g. such that the request signal can be de-asserted. This ensures that the request remains pending until each cache has acknowledged it.

In an embodiment, each of the processing units also contains second logic that is operable to perform an OR operation on the cache responses from the respective caches on the processing unit itself with the combined response signal received from the next processing unit in the chain. The second logic that resides on the master processing unit is thus operable to provide a second combined response signal (an OR signal) that represents whether or not any of the caches in the set of plural caches are currently responding (the OR signal therefore in an embodiment representing whether or not any of the cache response signals are currently set high).

For instance, when the OR signal is first set, this means that at least one of the caches in the set of plural caches to which the request was issued is currently responding. Correspondingly, when the OR signal drops (after it has been first set), this means that none of the caches are currently responding, e.g. as all of the cache response signals have been de-asserted (in response to the request signal being de-asserted). The master cache controller can thus determine on this basis that all of the caches have received the de-asserted request and that it is therefore safe to continue processing.

Thus, in embodiments, each processing unit has associated first logic for generating a first combined response signal indicating whether or not all of the caches in the set of plural caches to which the request was issued are currently responding to the request. In embodiments, each processing unit also has associated second logic for generating a first combined response signal indicating whether or not any of the caches in the set of plural caches to which the request was issued are currently responding to the request.

The effect of all this is that the multicast cache communication network is arranged to provide the master cache controller with one or more combined response signals that are indicative of an overall request-response status for all of the caches in the partition. For example, and in an embodiment, the determined overall request-response status may be that all of the caches in the set of plural caches have received the asserted request (or correspondingly that they have not yet all received the request) and/or that the request has been de-asserted for all of the caches in the set of plural caches, e.g. such that all of the caches have finished the request (or correspondingly that they have not yet all finished the request). In embodiments, two separate combined response signals (e.g. an AND signal and an OR signal) are provided to the master cache controller, as discussed above.

Thus, in embodiments, the master cache controller is operable to determine from the combined response signal(s) an overall request-response status for all of the caches in the set of plural caches to which the request was issued.

For instance, the master cache controller is in an embodiment configured to determine from the first and/or second combined response signals a current overall request-response status for all of the caches in the set of plural caches to which the request was issued. The determined overall request-response status is in an embodiment one or more of: (i) none of the caches in the set of plural caches to which the request was issued have received the request; (ii) at least some of the caches in the set of plural caches to which the request was issued have received the request; (iii) all of the caches in the set of plural caches to which the request was issued have received the request; (iv) at least some of the caches in the set of plural caches to which the request was issued have finished the request; and (v) all of the caches in the set of plural caches to which the request was issued have finished the request.

In an embodiment the master cache controller is operable to determine (at least of) these statuses in this order. For example, in embodiments, the master cache controller first determines whether (and when) all of the caches in the set of plural caches have received the request. After that point, the request signal may be de-asserted. The master cache controller then determines whether (and when) the de-asserted request signal has been received by all of the caches in the set of plural caches, e.g. such that all of the caches have finished the request (e.g. at which point the processing can resume, or e.g. the next request can be issued, etc.).

As explained above, this is in an embodiment achieved using two combined response signals, a first signal comprising an AND combination of the responses from all of the caches in set of plural caches (so that when AND is high, it is determined that all of the caches have received request) and a second signal comprising an OR combination of the responses from all of the caches in set of plural caches (so that when OR signal returns to low (after having previously been set high) all caches have stopped responding, e.g. such that it is determined that all of the caches have finished the request).

Thus, in embodiments, the overall request protocol is as follows: when the master cache controller issues a request, the master cache controller asserts a request signal; when the first cache responds, the OR signal will be set, but this will not cause any change; instead the master cache controller waits for the AND signal to be set before de-asserting the request signal as the setting of the AND signal confirms all of the caches have received request; the master cache controller then waits for the OR signal to drop as this confirms that all of the caches have finished the request.

A benefit of this is that the master cache controller need not know how many caches are in the partition, or which caches are responding, as it only requires overall knowledge of when all of the caches have responded and when all of the caches have completed the request.

The multicast cache communication protocol described above may thus allow for an improved, e.g. simplified, multicast communication protocol, e.g. that is in an embodiment agnostic as to which (and how many) of the caches have actually responded. This also facilitates an increased flexibility since each processing unit needs only to be connected to its adjacent processing units in a sequence of processing units for the partition, e.g. in a "daisy chain"-type arrangement, rather than having to connect each and every processing unit together directly.

The communication protocol above is also able to support asynchronous communications, as it can use a relatively simple handshake protocol, e.g. that simply relies on the combined response signals being set high/low, as described above.

This avoids the need for clock synchronization between the controller and the caches (since the request-response interface is synchronous to the controller). This approach is therefore particularly suitable for cache communications in partitions of different processing units where the processing units will typically, and in an embodiment do, have independent clock domains. In that case, one or more synchronisers may be provided, as necessary. For example, each processing unit may comprise one or more synchronisers (e.g. dual flip flop synchronisers) to account for crossing clock domain boundaries between processing units within a partition. As another example, the synchronisation could be performed by the master processing unit.

However other suitable multicast communication protocols could also be used, as desired.

The multicast cache communication network in an embodiment comprises at least a first communication line for transmitting request signal to the caches in the set of plural caches as well as second or further communication lines for transmitting response signals from the caches to the master cache controller. The communication network is in an embodiment arranged such that the communication lines for both the request and response signals are connected in sequence, e.g. in a "daisy chain" arrangement.

The request/response signals are transmitted over the communication network. The communication network is thus configured for handling such transactions. In some embodiments, the communication network is dedicated for such multicast communications, e.g., and in an embodiment, such that the communication network is configured only for handling such multicast transactions. (In that case additional communication networks may be provided for other communications, as will be explained further below.)

In some cases the multicast communication network may be able to route multicast communications to a specified subset of (less than all of) the caches for the processing units within a partition. In that case the set of plural caches that the master cache controller is able to transmit multicast signals to may be a subset of (less than all of) all of the caches within the partition.

However, in embodiments, the multicast communication network is configured for, and in an embodiment only for, "broadcast" communications to all of the caches within the partition, or at least to all of the caches of a certain type, e.g., to all of the TLBs from all of the processing units within the partition.

In some embodiments, as mentioned above, the communication network is configured for handling cache invalidation requests (e.g., and in an embodiment, is configured only for handling cache invalidation requests). For example, it may be beneficial to provide a dedicated network for cache invalidation requests, e.g. to avoid cache invalidation requests interfering with other communications in the network.

A cache invalidation request may be triggered in any suitable manner, as desired. For example, in the case of a set of plural TLBs, where a new set of memory address mappings needs to be used. This may be done after resetting the system. Or, this may be done in response a memory allocation fault. As another example, this may be triggered by a new software processing job for which the memory mappings needs to be re-configured. In an embodiment the cache invalidation request is a request to invalidate all of the data in the cache. However, this need not be the case.

For instance, whilst in some embodiments, the invalidation request/response signals may be the only communications over the multicast communication network, it would also be possible for the communication network to comprise further channels for providing other kinds of information.

For example the communication network may have a channel for providing identification information along with the cache invalidation request, which identifies which particular data is to be invalidated. Hence, rather than simply invalidating all the data in the caches, each cache can identify particular cache lines which store data corresponding to the identification information and then invalidate these lines while leaving other lines valid. For example the identification information could identify an address or group of addresses of data to be invalidated, or an address space or context for which data is to be invalidated.

In an embodiment the multicast cache communication network itself is also re-configurable for different partitions of processing units to allow cache controllers of different processing units within the group to be configured as the master cache controller for different respective partitions.

Providing a re-configurable cache communication network may facilitate an increased overall flexibility off the data processing system. For instance, this then avoids the need, for example, to fix the communication network at the time when the system is fabricated, as the communication network can be configured as desired, and, e.g., and in an embodiment, re-configured in use, e.g. such that the requirements for the multicast cache communication network do not constrain the configuring of the processing units into respective partitions.

For example, this means, and it is a benefit of the technology described herein, that all of the processing units within the group can be, and in an embodiment are, substantially functionally equivalent, e.g., and in an embodiment, identical, to one another, e.g. such that each and any of the processing units is in an embodiment configurable to act either as a master or slave processing unit as desired, with the communication network then being configured accordingly based on the organisation of the processing units within the partition.

For instance, as discussed above, each processing unit in an embodiment includes one or more communication bridges for connecting the processing unit with the other processing units in its respective partition, in an embodiment in sequence, e.g. in a "daisy chain"-type arrangement, e.g. such that each processing unit is connected (only) to the adjacent processing unit(s) in the chain. Each processing unit may therefore have a corresponding set of communication interfaces allowing for communications between adjacent processing units in the partition over the communication bridges.

To allow the multicast communication network to be configured for different partitions in the manner described above, each of the processing units may, e.g., and in an embodiment does, comprise a set of one or more isolation switches allowing the communication interfaces to be selectively isolated, e.g. to prevent communications from that communication interface. This isolation logic can therefore ensure the correct behaviour at power domain boundaries for the partition, e.g. by coupling the first and last units in a chain to ground or to a control voltage, or looping back requests to responses, as desired.

Thus, in embodiments, each processing unit includes one or more network interfaces for communications from adjacent processing units in the partition, and each processing unit further includes a set of one or more isolation switches that can be set to isolate communications from respective network interface.

For example, in embodiments, the master processing unit is positioned at one logical end of the sequence of processing units. An isolation switch on one side of the master processing unit may accordingly be set to isolate the master processing unit from communications from that side (since there should be no communications coming from that side as the master processing unit is at the end of the sequence of processing units). Correspondingly, a final slave processing unit positioned at the other end of the sequence of processing units may be isolated at the other end. Where there are one or more intermediate "slave" processing units positioned between the master and final processing units, these may be open to communication at both ends, to allow communications to pass from processing unit to processing unit along the sequence of processing units.

Thus, each processing unit can in an embodiment be configured either as a master or slave processing unit, and the communication network configured appropriately, e.g. by appropriately setting the relevant isolation switches, e.g. based on the position of the processing unit within the sequence of processing units.

However, other logical network arrangements could also be used. For example, in another embodiment, the processing units in a partition may be connected in a "ring" arrangement, in which case each processing unit's interfaces may be open at both ends such that communications can pass around the ring.

In an embodiment, the operation in the manner of the technology described herein can be selectively activated for a given output to be generated by a processing unit.

This operation may be controlled, e.g., by a (software) driver for the processing unit, or an appropriate hypervisor, or "arbiter" which controls access to the processing unit(s). Thus, in an embodiment, the processing unit(s) can be selectively configured to operate in the manner of the technology described herein, e.g., and in an embodiment, on an output-by-output basis.

Other arrangements would, of course, be possible.

Subject to the requirement to be operable in accordance with the technology described herein, the processing unit (or units) of the data processing system may otherwise comprise any or all of the normal components, functional units, and elements, etc., that such a processing unit may comprise.

Each processing unit may have the same set of functional units, etc., or some or all of the processing units may differ from each other.

As explained above, to facilitate flexibility, all of the processing units within the group are in an embodiment substantially functionally equivalent, e.g. such that any of the processing units can in principle be configured to act either as a "master" or "slave" for a respective partition. Each of the processing units therefore in an embodiment includes the same functional units (although some of the functional units may be made "inactive", e.g. when they are operating as a slave).

Thus, in the case of graphics processing units, for example, each graphics processing unit in an embodiment includes one or more execution units, such as one or more shader (programmable processing) cores. In an embodiment, each graphics processing unit includes a plurality of shader cores, such as three or four shader cores.

In an embodiment, the graphics processing units (and thus the graphics processing system) are tile-based graphics processing units, and one or more of (e.g. all of) the graphics processing units also includes a tiling unit (a tiler or hierarchical tiler).

The processing unit may be operated to perform processing under the control of a host processor (e.g. CPU). The host processor can be any suitable and desired host processor of a data processing system. The host processor can, and in an embodiment does, execute applications that may require data processing by the processing unit, and includes and executes an appropriate driver (e.g. including a compiler) for the processing unit, such that it can prepare commands, instructions, data structures, etc., for execution and use by the processing unit to perform desired data processing operations in response to requests for data processing operations from applications that are executing on the host processor.

The processing unit in an embodiment also comprises one or more of, and in an embodiment all of: a management unit (e.g. a job manager) that provides a host processor (or virtual machine) (software) interface for the processing unit and is also operable to divide a data processing task allocated to the processing unit into subtasks and to distribute the subtasks for execution to the execution unit or units of the processing unit; a cache (e.g. a L2 cache) for handling data generated by the processing unit and that provides an interface to an external (main) system memory of the data processing system.

In an embodiment, at least some of the functional units (e.g. shader cores, management unit, L2 cache, etc.) of the processing unit include an address translation cache (such as a translation lookaside buffer). The processing unit in that case in an embodiment also comprises a memory management unit (MMU) (however, appropriate memory management units could also or instead be located externally to the processing unit or units, if desired).

As mentioned above, the technology described herein may find particular utility for multicast communications to such address translation caches, e.g. TLBs, within the processing units within a partition, and in an embodiment the communication network is configured for handling such communications (and, e.g., and in an embodiment, only for handling such multicast communications to the address translation caches within the processing units within the partition.

However, the technology described herein may in general be applied to any suitable cache systems, and any suitable type or level of cache that may be provided within the processing units.

Each processing unit will also comprise appropriate communications networks for providing communications between the various units of the processing unit, such as memory transactions between execution units and/or the cache of the processing unit, subtask control traffic between the job manager and execution units and so on.

Other configurations of processing unit would, of course, be possible.

The communications network described above, and to which the technology described herein particularly relates, is configured to handle "multicast" cache communications. In embodiments, the communications network is dedicated for such multicast cache communications, such that it may not be usable for other types of communication. In that case, and typically, there will be other communication networks within the processing system allowing for other types of (e.g. cache) communications.

For instance, in an embodiment, a separate cache communication network is provided for supporting "unicast" cache communications from the master cache controller to any specific (single) cache within the partition. For instance, most of the communications issued by the master cache controller during a processing operation may be unicast communications, which target a specific one of the caches.

In an embodiment the unicast cache communication network is configured as a switch network which provides multiple communication paths between the master cache controller and any given cache within a processing unit within the partition that the master cache controller is configured for. Hence, when one communication path is blocked because it already being used for providing a signal over the network, the switch network may select another path for routing a signal to the target cache. If such a switch network was also used for multicast communication, then when a multicast message is sent, this could block a significant number (or even all) of the communication paths available for communicating with a given cache, so that other communications are delayed. This can be avoided by providing a separate network that is dedicated for multicast communications, and this is in an embodiment the case in the technology described herein, as explained above.

However, other arrangements would be possible, and subject to the particular requirements for the multicast communication network of the technology described herein, the data processing system of the technology described herein may generally comprise any (other) suitable communication networks, as desired.

As well as the processing units, controller, etc., necessary for operation in the manner of the technology described herein, the data processing system may otherwise include any other suitable and desired components, elements, units, etc., that a data processing system may comprise.

Thus, the data processing system may, e.g., include one or more peripheral devices, such as one or more output devices (e.g. display screens, vehicle controllers, etc.), and/or one or more input devices (e.g. human-computer interfaces, vehicle sensors, etc.).

In embodiments, where the data processing system includes a plurality of processing units (which may either be operated independently of each other or in combination), each processing unit can in an embodiment receive processing instructions, e.g. from a (driver that is executing on a) host processor or virtual machine that requires the data processing output, and carry out received instructions independently. For example, each processing unit in an embodiment has an associated (task) management circuit (e.g. job manager) that can provide a suitable software interface for the processing unit when operating in standalone mode. In an embodiment at least some of the processing units can also be operated in combination, e.g. in a master-and-slave arrangement.

The virtual machines (host processors) may have access to the same set of one or more peripheral devices, or, e.g., a separate set of peripheral devices may be provided for different groups of virtual machines (again, this may be beneficial for safety and/or security purposes).

The overall data processing system in an embodiment includes appropriate (system) memory for storing the data used by the processing units when carrying out processing and/or for storing the data generated by the processing units as a result of carrying out processing. Different groups of processing units may be configured to be connected to the same (system) memory, or separate system memories may be provided for different groups (again, this may be beneficial for safety and/or security purposes).

Correspondingly, different groups of the processing units may be connected to the external system memory via the same or different memory interconnects.

Thus, in an embodiment, the data processing system includes the processing units, and one or more host data processing units (processors) (e.g. central processing units) on which one or more virtual machines execute (in an embodiment together with one or more drivers (for the processing units)).

In an embodiment, the data processing system and/or data processing units comprise, and/or are in communication with, one or more memories and/or memory devices that store the data described herein, and/or that store software for performing the processes described herein.

In one embodiment, the various functions of the technology described herein are carried out on a single system on chip (SoC) data processing system.

The technology described herein can be implemented in any suitable system, such as a suitably operable microprocessor based system. In some embodiments, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuits, circuitry, processing logic, microprocessor arrangements, etc., that are operable to perform the various functions, etc., such as appropriately dedicated hardware elements (processing circuits) and/or programmable hardware elements (processing circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits, etc., if desired.

Subject to any hardware necessary to carry out the specific functions discussed above, the data processing system and graphics processor can otherwise include any one or more or all of the usual functional units, etc., that data processing systems and graphics processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described.

FIG. 1 shows an embodiment of a data processing system in the form of an automotive system-on-chip (SoC).

As shown in FIG. 1, the data processing system 1 of this embodiment comprises three CPU (central processing unit) clusters: a first "quality managed" (QM) cluster 2, comprising a CPU 3 running "quality managed" software (thus the CPU 3 does not have automotive safety features); a second, "ASIL" (automotive safety integrity level) (functional safety, FuSa) cluster 4, comprising a CPU 5, but this time running appropriately safety certified software; and a "safety island" cluster 6, comprising a CPU 7 that runs safety certified software for configuration of the system and fault handling.

As shown in FIG. 1, each CPU cluster also comprises its own general interrupt controller (GIC) 8, 9, 21.

As well as the CPU clusters, the system also comprises a "graphics processing" cluster 10, comprising a set 11 of graphics processing units ("slices"), that are able, as will be discussed further below, to provide processing functions to virtual machines executing on the QM cluster 2 and the ASIL cluster 4.

In this example, the set 11 of graphics processing units comprises eight graphics processing units (slices 0-7, where each slice is a graphics processing unit of the set), but other numbers of graphics processing units would, of course, be possible. As will be discussed further below, in this embodiment the graphics processing units (GPUs) can be operated in various modes, namely either as "standalone" GPUs, or as one or more linked sets of a primary (master) and one or more secondary (slave) GPUs.

The graphics processing units 11 also have associated with them (as part of the graphics processing cluster 10), a management circuit (partition manager) 12.

As shown in FIG. 1, the system supports three separate communications bus connections for the graphics processing cluster 10: a first communications bus 18 that may be used, for example, for non-safety critical traffic and thus by the QM cluster 2; a second bus 19 that may be a safety-critical/secure bus and used, for example, for safety critical traffic and thus by the ASIL cluster 4; and a third bus 20 that may be a safety-critical/secure bus but that also has privilege restrictions (i.e. can only be accessed by appropriately privileged bus masters) and that is used for configuration communications only by the safety island 6.

The system also includes an appropriate system cache 13, DRAM controller 14, interconnects 15, 16 and a system memory management unit (sMMU) 17 (that, e.g., provides second level address translation separating safe and non-safe address spaces and isolates the memory access for each virtual machine based on the per-access window stream IDs) for the graphics processing cluster 10.

There may, of course, be functional units, processors, system elements and components etc., that are not shown in FIG. 1.

The management circuit (partition manager) 12 for the graphics processing units 11 is operable to configure and set a configurable communications network that sets the communications paths between the different graphics processing units (slices) 11, and also how the (and which) graphics processing units communicate with the QM cluster 2 and the ASIL cluster 4 (and in particular which of the buses 18, 19, can be used to communicate with the respective graphics processing units). In particular, it can set that communications network to configure the graphics processing units (slices) 11 into, in this embodiment, two different groups of the graphics processing units, one group for the QM cluster 2 (and coupled to the bus 18 for that cluster), and one group for the ASIL cluster 4 (and coupled to the bus 19 for that cluster).

As well as being able to set the configurable communications network to subdivide the graphics processing units into different groups, the management circuit (partition manager) also supports and can configure the organisation of the graphics processing units of a group into one or more independently allocatable partitions (subsets) of the graphics processing units (slices) of the group.

The management circuit (partition manager) 12 also provides a set of "access windows" in the form of communications interfaces whereby a virtual machine may access and control a given partition of the graphics processing units. Each such access window comprises, in the present embodiments, a set of (communication) registers having a corresponding set of physical addresses that can be used to address those registers.

These access windows also provide the mechanism whereby a virtual machine may communicate with an arbiter (with the arbiter for the group of graphics processing units that the virtual machine is to used), and in particular provide a mechanism for a virtual machine and arbiter to exchange messages, for example in relation to the virtual machine requesting processing resources, and the arbiter controlling access of the virtual machine to the (partitions of) processing units, for example to signal when the access window is enabled to use a partition, and/or when the virtual machine is to relinquish its use of a partition, e.g. so as to permit a different virtual machine to access the partition. The virtual machine-arbiter interface is separate to the virtual machine-graphics processing unit partition interface.

Thus, the graphics processing cluster 10 effectively provides a set of graphics processing resources, comprising the graphics processing units (slices) 11, and the partitions and access windows supported by the management circuit 12, which resources can be subdivided into plural (in the present embodiment two) graphics processing resource "groups", each containing one or more of the graphics processing units (slices) and having associated with them one or more of the independently allocatable partitions of the graphics processing units and one or more "access windows".

In the present embodiment, the management circuit (partition manager) 12 supports the subdivision of the graphics processing units 11 into two different groups (one for use by the QM cluster 2, and the other for use by the ASIL cluster 4), into a maximum of four partitions, and provides a set of 16 access windows for virtual machines to communicate with the partitions of the graphics processing units. Other arrangements would, of course, be possible.

In the present embodiments, the configuration of these graphics processing resources into the respective groups is done by the management circuit (partition manager) 12 under the control of a (privileged) controller executing on the safety island 6, and respective arbiters executing on the QM cluster 2 and the ASIL cluster 4.

To support this operation, the management circuit (partition manager) 12 further comprises appropriate configuration interfaces, e.g., and in an embodiment, in the form of appropriate sets of configuration registers, that can be respectively accessed and set by the controller on the safety island 6 and the arbiters on the CPU clusters. The controller and arbiters can correspondingly set their configuration registers accordingly, to thereby control the management circuit (partition manager) 12 to configure the graphics processing resources (and in particular the configurable communications network that configures the graphics processing resources) accordingly. The management circuit (partition manager) 12 may also include one or more state machines for this purpose.

Figure 2:
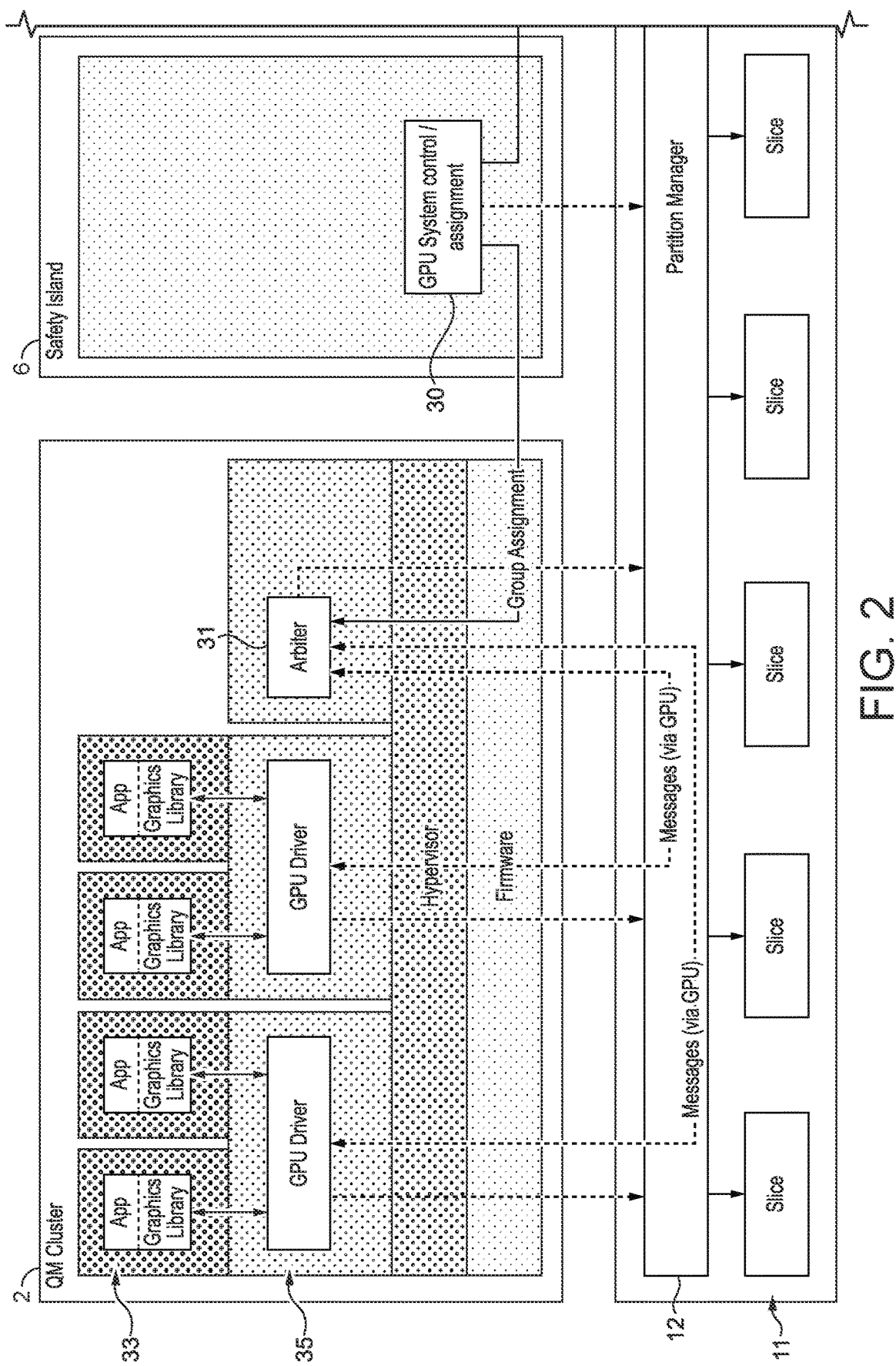
FIG. 2 shows schematically further details of the data processing system of FIG. 1.
Figure 2:
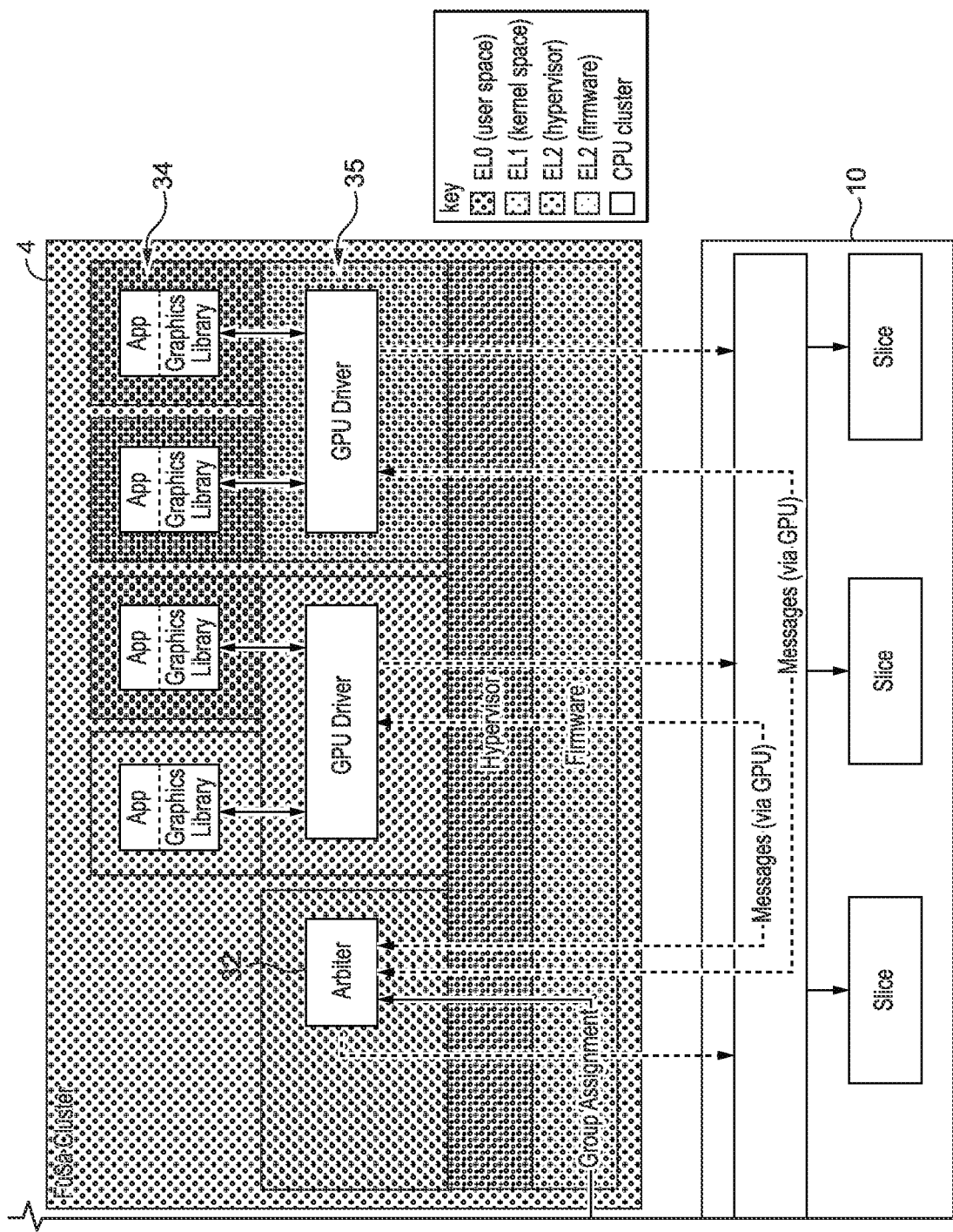

FIG. 2 illustrates this, and shows the QM cluster 2, ASIL (FuSa) cluster 4, and safety island 6, together with a (privileged) system controller 30 executing on the safety island 6, an arbiter 31 executing on the QM cluster 2, and an arbiter 32 executing on the ASIL (FuSa) cluster 4.

The arbiters 31, 32 are operable to control access by virtual machines executing on the respective clusters to the corresponding graphics processing resource group that has been allocated to that cluster. The arbiter 32 for the ASIL cluster 4 is configured to operate in and supports operation in an appropriate safety critical manner. The arbiter 31 for the QM cluster does not need to be configured to operate and support safety critical operation.

Each arbiter may operate in association with a corresponding hypervisor for managing the operation of virtual machines that is executing on the cluster in question (but is separate to the hypervisor).

FIG. 2 also shows a corresponding set of virtual machines 33 executing on the QM cluster 2, and a set of virtual machines 34 executing on the ASIL cluster 4. In this example, it is assumed that there are two virtual machines executing on each cluster, although other arrangements would, of course, be possible. Each cluster correspondingly executes an appropriate graphics processing unit (GPU) driver 35 for each virtual machine that it supports.

FIG. 2 also shows the corresponding communications links between the controller 30 and arbiters 31, 32, and from the controller 30 and arbiters 31, 32 and virtual machines 33, 34 (via the drivers 35) to the management circuit (partition manager) 12 of the graphics processing unit cluster 10.

The controller 30 is able to assign to each "resource group" that it configures, one or more graphics processing units of the set of graphics processing units 10, one or more of the partitions that the partition manager 11 supports, and one or more of the access windows that the partition manager supports. Each group is also assigned to a respective one of the "cluster" communication buses 18 and 19, in dependence upon whether the group is to be used by the QM cluster 2 (in which case it will be assigned to the corresponding QM cluster bus 18) or by the ASIL cluster 4 (in which case it will be assigned to the ASIL bus 19).

In order to configure the respective groups of graphics processing resources that are to be made available to the QM cluster 2 and ASIL cluster 4, the controller 30 on the safety island 6 sets appropriate configuration parameters in the (privilege-restricted) configuration registers of the management circuit (partition manager) 12, in response to which the management circuit 12 configures the communications network for the graphics processing unit (slices) 11 accordingly. As shown in FIGS. 1 and 2, the controller 30 communicates with the management circuit (partition manager) 12 directly, via the restricted configuration bus 20.

As will be appreciated from the above, in this embodiment of the technology described herein, the graphics processing units and their associated management circuit can, in effect, be considered to be divided into three different "safety" domains, a "control" safety domain 50, comprising the main configuration control of the management circuit 12, that is owned and controlled by the "safety island" CPU cluster 6, and then two further domains, comprising a "safety critical" domain 51 that comprises a group of graphics processing resources being used by and owned by the "safety critical" ASIL CPU cluster 4, and a second, "non-safety critical" domain 52 comprising a group of graphics processing units, etc., that is to be used, and owned by the QM CPU cluster 2.

Figure 3:
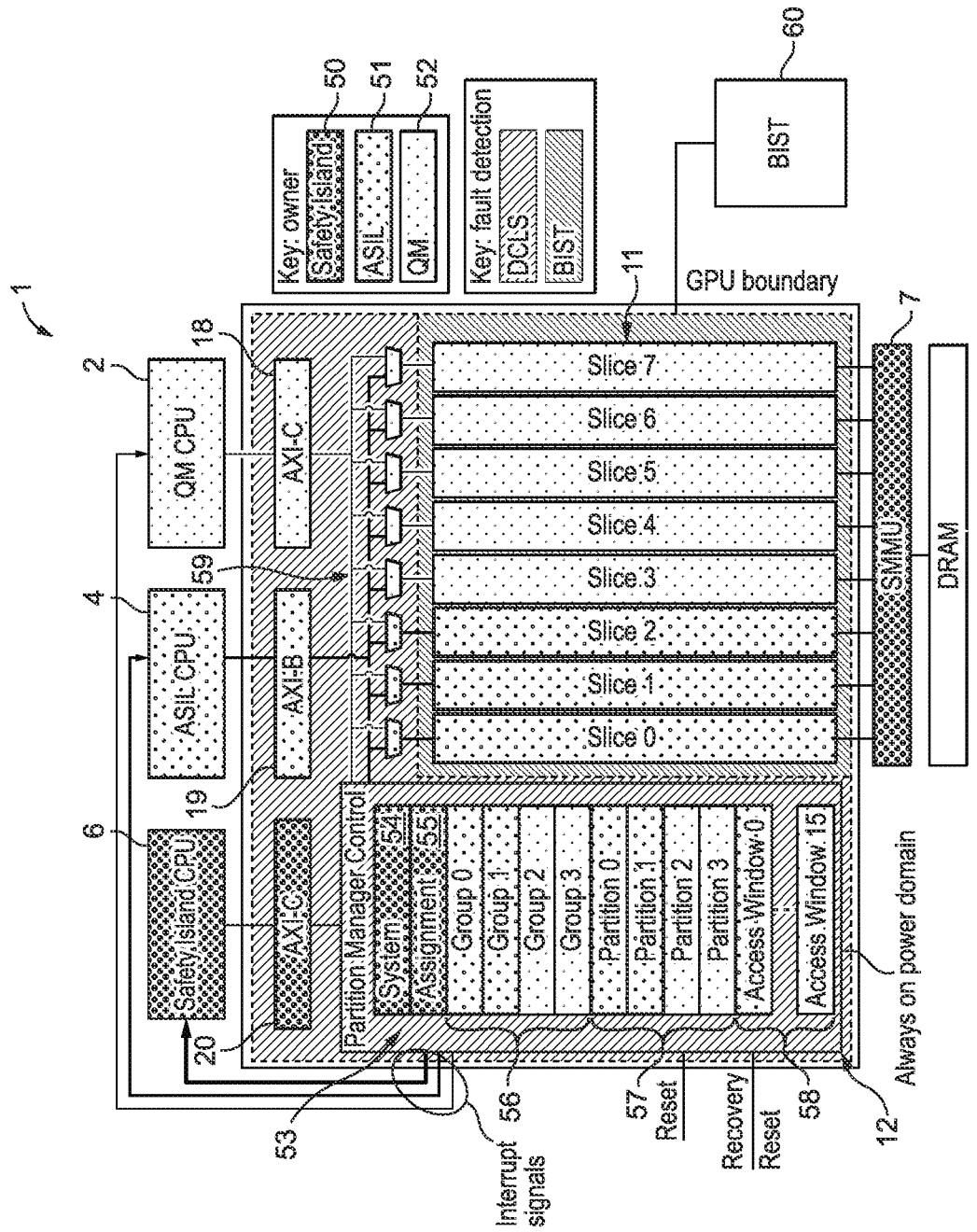
FIG. 3 shows schematically further details of the data processing system of FIGS. 1 and 2.

FIG. 3 illustrates this and shows in more detail the arrangement of the management circuit and the distribution of the "ownership" of different aspects of the management circuit and the graphics processing units between the different domains.

As shown in FIG. 3, the management circuit (partition manager) 12 includes, inter alia, a set of control interfaces (communications interfaces) 53 that may be used to control the management circuit to configure the groups of graphics processing resources, and then to use the resources in the groups. These control (communications) interfaces comprise respective address spaces and sets of registers that can be addressed by appropriate software executing on the processors (processor clusters).

These control interfaces comprise firstly a "system" interface 54 that comprises a set of control registers that may be used, for example, to set system parameters, such as the stream IDs to be used for respective access windows.

The system interface 54 may also be used (by the controller 30) to configure the fault protection and detection settings (operation), such as enabling the desired fault detection mechanisms (and their interrupts), enabling fault detection for the desired groups, partitions and graphics processing units, and/or configuring the behaviour in the event of a fault (e.g. whether fault reporting is enabled or disabled, the current operation should be terminated or continued, etc.).

There is then an "assignment" interface 55, which is used by the controller 30 on the safety island CPU cluster 6 to set the allocation of resources (so graphics processing units (slices), partitions and access windows) to the respective groups, and the allocation of the groups to the respective communications buses.

As shown in FIG. 3, these interfaces 54, 55 of the management circuit are used by and belong to the controller 30 on the safety island processor cluster 6, and are accessed via (and only accessible via) the corresponding privileged bus 20 for communicating with the safety island CPU cluster 6.

The management circuit 12 then further includes a set of "group" configuration interfaces 56, which can be used by the arbiters for the respective groups to configure the resources within the group, and in particular to configure and set up the allocation of graphics processing units and access windows to respective partitions within the groups.

As shown in FIG. 3, these group configuration interfaces are accessible to and will be accessed by the respective arbiters to which the groups have been assigned, via the corresponding communications bus for the processor cluster that the arbiter is executing on.

In the example shown in FIG. 3, it is assumed that groups 0 and 1, partitions 0 and 1, graphics processing units (slices) 0-2 and an appropriate set of access windows have been assigned to the ASIL CPU cluster 4, and so will be controlled by the corresponding arbiter 32 for that cluster via the ASIL cluster communications bus 19.

Correspondingly, groups 2-3, partitions 2-3, graphics processing units 3-7 and a suitable set of access windows have been assigned to the QM cluster 2, and so will be controlled by the arbiter 31 for that cluster over the QM cluster bus 20.

Other distributions of the resources into groups (and thus as between the CPU clusters) could be used if desired.

As well as the group configuration interfaces 56, the management circuit also provides a set of partition control interfaces 57, which may be used by the arbiter for the group of graphics processing units that the partition belongs to, inter alia, power a partition on and off, reset the partition, and, also, and as will be discussed further below, trigger fault detection testing for the partition in question.

The management circuit 12 then finally provides, as discussed above, a set of access windows 58, to provide the communication and control interface whereby a virtual machine may access and control a partition of a group of graphics processing units that it has been allowed access to. As discussed above, the access windows also provide an appropriate message passing interface for communications between the arbiter and the virtual machine that the access window belongs to.

FIG. 3 also shows the configurable communications network 59 of the management circuit that, as discussed above, can be set under the control of the controller on the safety island 6 to configure the graphics processing units into the respective groups, and to be coupled to the appropriate one of the communication buses 19, 20, etc.

The management circuit is connected to, as discussed above, three separate communications buses that can be used to communicate with the management circuit and the graphics processing units, namely a privilege-restricted bus 20 for communicating with the safety island CPU cluster 6, a bus 19 for communicating with ASIL CPU cluster 4 and a bus 20 for communicating with the QM CPU cluster 2.

In order to further support and facilitate separation between the hardware of different groups of graphics processing units (and thus the different domains), the management circuit 12 is able to power respective partitions of graphics processing units, and individual graphics processing units within a partition of graphics processing units, on and off independently of each other, and, correspondingly, can reset a partition of graphics processing units (and individual graphics processing units within a partition), independently of each other. This is done under the control of the arbiter for the group of graphics processing units in question, via the corresponding partition interface 57.

On the other hand, as shown in FIG. 3, the management circuit itself is always powered on (and may only be powered off under the control of the system controller 30 on the safety island CPU 6). Correspondingly, the management circuit can only be reset by the system controller 30 on the safety island CPU 6. As shown in FIG. 3, in this embodiment there are two levels of "reset" that can be applied to the management circuit, a first "reset" that resets all hardware, and a second "recovery reset" that resets all hardware except for error reporting mechanisms (which may, e.g., be used when error recovery requires a reset (e.g. because a unit is unresponsive)).

Also, as shown in FIG. 3, each CPU cluster has its own, independent interrupt. In this embodiment, both the management circuit, and each partition of graphics processing units, can generate its own, independent interrupt. The interrupts are broadcast to all of the CPU clusters of the system, with the corresponding interrupt controller for each CPU cluster identifying whether the broadcast interrupt applies to it or not (is for a partition of a group of graphics units that is under its ownership in the case of the ASIL CPU cluster 4 and the QM CPU cluster 2, or is from the management circuit in the case of the safety island CPU cluster 6).

In the present embodiment, in order to further support the operation of the groups of graphics processing units in separate, "safety critical" and "non-safety critical" domains, and under the control of a "safety island" domain, the system further supports and uses appropriate fault protection mechanisms for the management circuit 12 and the graphics processing units 11.

In particular, the management circuit is permanently operated at a higher (high) level of fault protection, in this embodiment by being always and permanently subjected to a fault detection process (monitoring). This is achieved in the present embodiment by protecting the management circuit using a dual core lockstep fault detection mechanism, i.e. the management circuit is instanced twice, with one instance of the management circuit being used to check the operation of the other instance of the management circuit at all times (and such that if there is any discrepancy between them, that will be taken as indicating a fault).

The graphics processing units, on the other hand, are not protected by dual-core lockstep, but are instead able to be protected against faults using built-in self-testing (BIST). In the present embodiment, this built-in self-testing can be selectively triggered for a graphics processing unit, under the control of the arbiter for the group of graphics processing units that the graphics processing unit belongs to. In particular, as discussed above, the arbiter can use the partition control interfaces 57 to trigger BIST fault detection testing for a partition.

As shown in FIG. 3, in order to support the use of BIST fault detection testing for the graphics processing units, the data processing system further comprises an appropriately configured BIST unit (circuit) 60. Thus when the arbiter for a group of graphics processing units indicates that a graphics processing unit should undergo a built-in self-test, that test will be performed appropriately for the graphics processing unit in question by the BIST unit.

Figure 4:
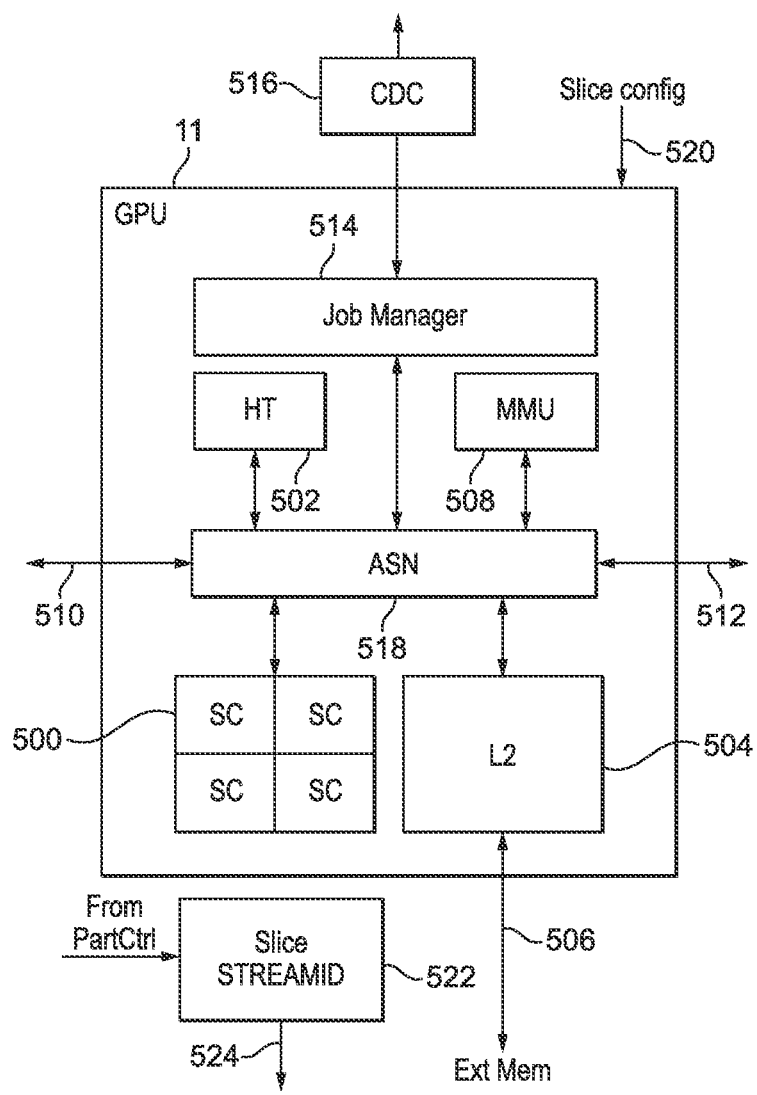
FIG. 4 shows schematically and in more detail components of a graphics processing unit in an embodiment.

FIG. 4 shows in more detail the arrangement and components of each graphics processing unit (slice) 11 in this embodiment.

As shown in FIG. 4, in this embodiment, each graphics processing unit (slice) comprises one or more execution units, such as programmable processing (shader) cores 500 (SC) and a hierarchical tiler 502 (HT). In this embodiment, each graphics processing unit is tile-based. Different graphics processing units 11 may have different sets of execution units, and there are more possible types of execution units than those shown in FIG. 4.

Each graphics processing unit also includes a level 2 cache 504 (L2) that inputs data to be used in the data processing tasks and outputs the resultant output data via a cache interface 506. The cache interface 506 is connected to external system memory 116 via a suitable memory interconnect. The graphics processing units may also include a memory management unit (MMU) 508, but this may also or instead be located externally to the graphics processing units.

Each graphics processing unit 11 also includes one or more communication bridges comprising a slave bridge 510 for connecting to a master graphics processing unit (the master graphics processing unit may be connected directly, or through a daisy chain of other slave graphics processing units), and/or a master bridge 512 for connecting to slave graphics processing units. The master bridge 512 is used in master mode to connect one or more slave graphics processing units (through daisy-chaining), and may also be used in slave mode to connect further daisy-chained slave graphics processing units.

In the present embodiment, the communication bridges 510, 512 are implemented to support an asynchronous interface between graphics processing units, as this allows easier physical implementation of the graphics processing units as the clock can then be independent when the graphics processing units are linked.

Each graphics processing unit also includes a job manager 514. This provides the software interface for the graphics processing unit 11, and thus receives via a task interface 516 tasks (commands and data) for a virtual machine from a driver running on CPU cluster in question, and divides a task given by the driver into subtasks and distributes the subtasks for execution to the various execution units (shader cores 500, tiler 502) of the graphics processing unit. Where a graphics processing unit 11 is able to operate as a master, the job manager 514 is configured to also be able to control execution units of linked slave graphics processing units. Correspondingly, for a graphics processing unit 11 that is able to operate as a slave, the job manager 514 is able to be disabled when the graphics processing unit is operating in slave mode.

As shown in FIG. 4, the various functional units, etc., of each graphics processing unit are connected to each other via an asynchronous communications interconnect 518 that carries various traffic such as memory transactions between execution units and the level 2 cache 504 (L2), subtask control traffic between the job manager 514 and execution units, and so on. As shown in FIG. 4, the asynchronous interconnect 518 also connects to the respective slave and master bridges 510, 512 of the graphics processing unit 11 and includes appropriate switches (not shown) that can be activated to enable or disable communication across (via) the bridges 510, 512 to a connected graphics processing unit.

The different operating modes of the graphics processing unit (standalone, master and slave modes) are set (enabled and disabled) by configuring the routing of the asynchronous interconnect 518 appropriately. Thus, for example, when the graphics processing unit is to operate in standalone mode, the slave and master bridges 510, 512 are disabled to prevent communication via (across) the bridges. Correspondingly, when a graphics processing unit is to act as a master, the master bridge 512 is enabled to allow communication with a connected graphics processing unit. Correspondingly, when a graphics processing unit is to act as a slave, the slave bridge 510 is enabled to allow communication with a connected graphics processing unit.

In the present embodiment, the asynchronous interconnect 518 is reconfigured by the management circuit (partition manager) 12 through a configuration interface 520 of the graphics processing unit 11. Any routing configuration (or reconfiguration) in an embodiment only happens during reset of the graphics processing unit.

Each graphics processing unit 11 also has associated with it an identifier unit 522 that stores an identifier or identifiers assigned to the (currently enabled) access window for that graphics processing unit. The identifier is provided by the management circuit 12 via an identifier interface 524 for the graphics processing unit. The graphics processing unit can then, e.g., output the identifier together with the output data from the L2 cache 504. The identifier can be used for memory access permission checking, e.g. a virtual machine and/or graphics processing unit may not be able to access data associated with another virtual machine and/or graphics processing unit because it does not know the correct identifier for accessing that data.

FIG. 4 shows an overview of the graphics processing units according to this embodiment of the technology described herein. However, it should again be noted that FIG. 4 is only schematic and that various components and connections have been omitted from that Figure for the sake of clarity.

Equally, the data processing system and/or graphics processing unit(s) of the present embodiment may include, as appropriate, one or more of the features described in US 2017/0236244, the entire contents of which is incorporated herein by reference, and/or US 2019/0056955, the entire contents of which is incorporated herein by reference.

The present embodiment is particularly concerned with cache communications, and in particular to providing an efficient multicast cache communication protocol for simultaneously invalidating all of the address translation caches (e.g. TLBs) within a partition of plural processing units. As will be explained further below, this may be desired, e.g., when the memory needs to be updated, and a new set of address mappings configured accordingly.

Figure 5:
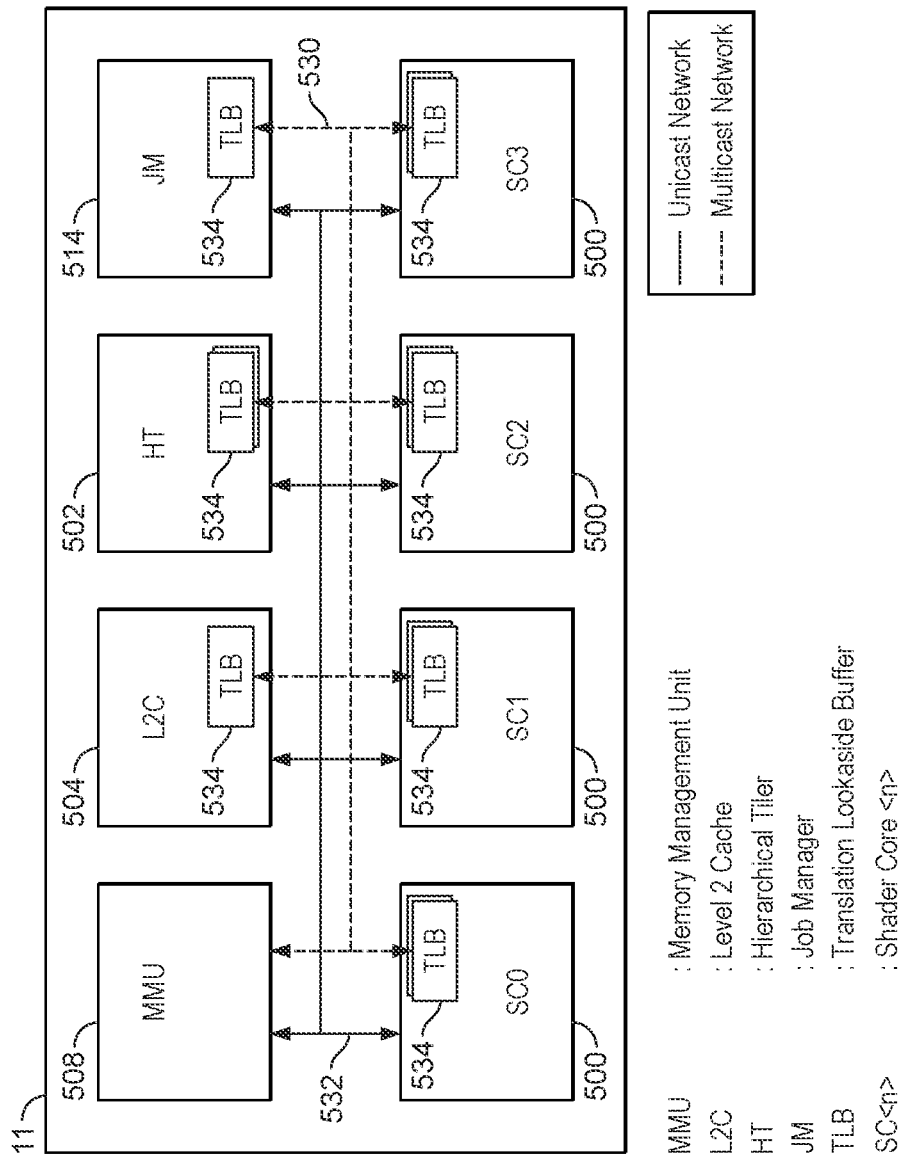
FIG. 5 shows schematically and in more detail components of a graphics processing unit in an embodiment including internal cache communication networks.

For instance, as shown in FIG. 5, at least some of the functional units of the graphics processing units may themselves comprise an address translation cache (e.g. TLB) 534 that can be used to store recent virtual memory to physical memory address translations for use by the functional unit. For example, all memory addresses that are issued by software and operated on by the functional unit may be "virtual" memory addresses. In order to access the external physical memory, a virtual address must therefore be translated to a physical memory address.

In the example shown in FIG. 5, which generally corresponds to FIG. 4, there are four programmable processing (shader) cores 500 (SC), each of which has a set of two TLBs 534. The hierarchical tiler 502 (HT) also has a set of two TLBs 534, and the level 2 cache 504 (L2) and job manager 514 (JM) each have an respective TLB 534. Other arrangements would of course be possible.

To facilitate communications between memory management unit (MMU) 508 and the respective TLBs 534 within the functional units of the graphics processing unit 11, various communication networks are provided. In particular, in the example shown in FIG. 5, the graphics processing unit 11 includes two internal communication networks for such cache communications; a "unicast" network 532 that is operable to route communications from the memory management unit (MMU) 508 to any single one of the TLBs 534 within the graphics processing unit 11, and a separate "multicast" network 530 that is operable to route communications to and from the memory management unit (MMU) 508 for all of the TLBs 534 at the same time.

When the graphics processing unit 11 is operated in combination with other graphics processing units, in a respective partition of plural processing units, this means that the partition will therefore have an associated set of TLBs that comprises all of the TLBs 534 within each of the graphics processing units 11 within the partition in question.

The cache communication networks in the present embodiment are therefore extended to allow for communications to be transmitted across different graphics processing units 11 within a partition.

Figure 6:
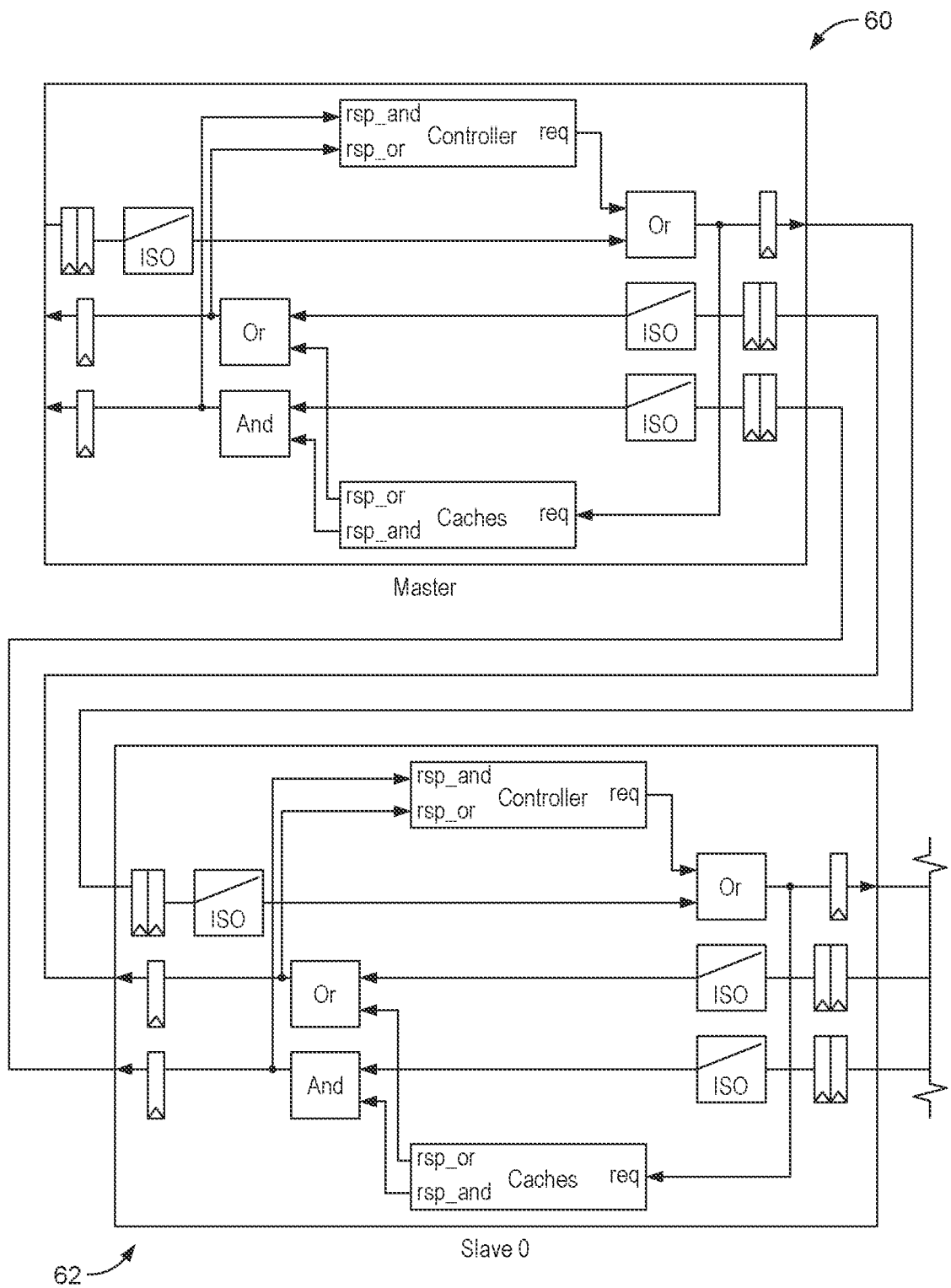
FIG. 6 shows schematically a partition of plural processing units arranged in a "master-slave" configuration according to an embodiment.
Figure 6:
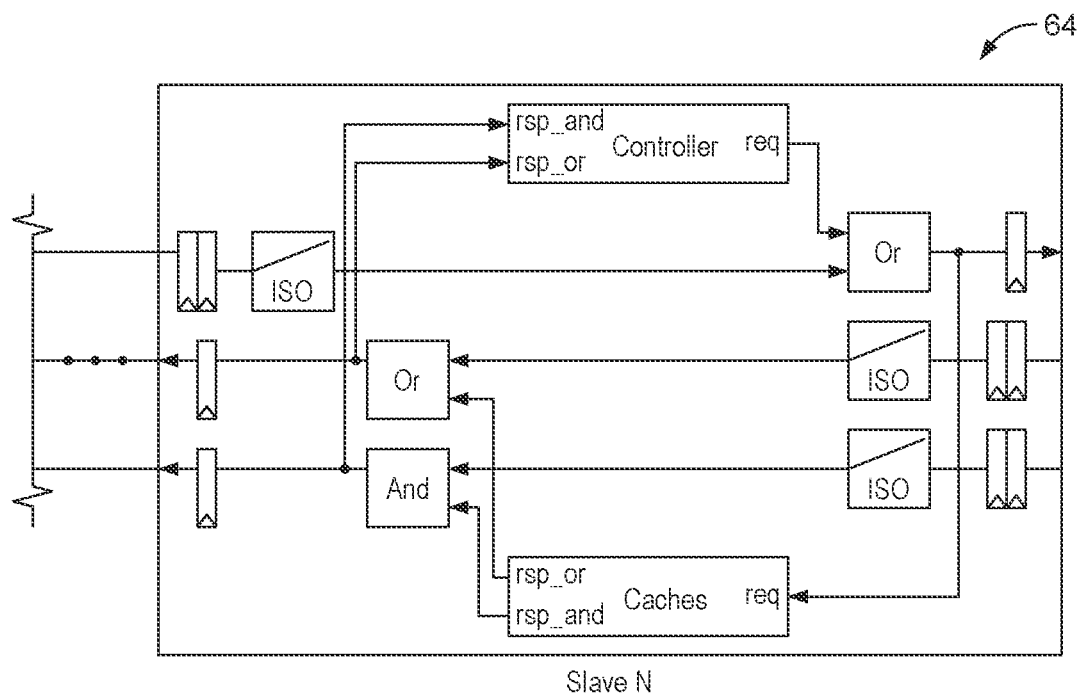

This is shown in FIG. 6 which shows an example of a partition of processing units wherein a first processing unit 60, on the left hand side, is configured as a master processing unit for the partition, and wherein a number of slave processing units 0 . . . N are connected to the master processing unit in sequence, e.g. in a daisy chain arrangement.

In this case, the cache controller (e.g. MMU 508) of the master processing unit can be designated as a master cache controller for the partition of processing units, such that the designated master cache controller is operable to transmit signals to and from all of the caches (e.g. TLBs) within the partition of plural processing units across the communication bridges as shown in FIG. 6.

Thus, the processing units within the partition are collectively configured to provide a communication network allowing cache communications to be transmitted from the master cache controller to all of the caches (e.g. TLBs) within the partition (including the caches (TLBs) that reside on the master processing unit itself as well as any caches (TLBs) that reside on the other, slave processing units). Thus, a logical cache communication network is provided over the partition that comprises the respective cache communication networks 532, 530 of each processing unit in the partition, as well as the communication bridges that interconnect adjacent processing units.

In the example shown in FIG. 6, the master processing unit 60 is located logically at one end (on the left hand side) of the partition. This means that the master processing unit 60 should not receive any communications from that (the left) side. Similarly, the final slave processing unit 64 in the partition, which is located logically at the other end of the partition, should not receive any communications from that (the right) side. On the other hand, any intermediate slave processing units 62 may receive communications from either side, and should be configured accordingly.

Figure 7:
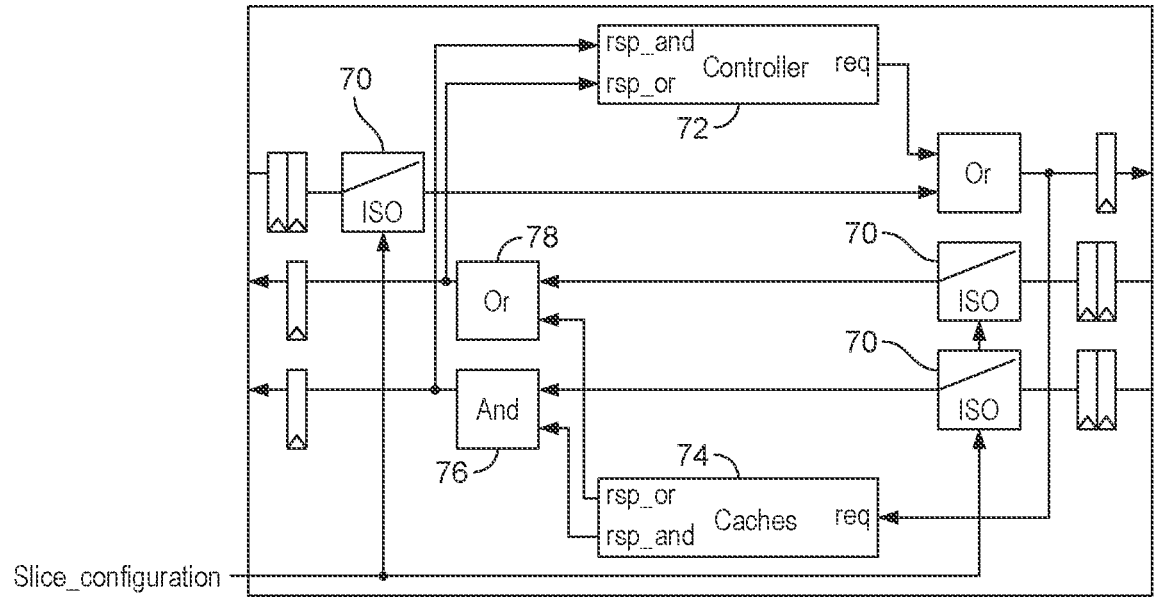
FIG. 7 shows schematically a communication network within a processing unit for allowing cache communications to be transmitted across the processing unit to other processing units within a partition of plural processing units to which the processing unit belongs.

To facilitate this, as shown in FIG. 7, each processing unit comprises a set of isolation switches 70 that are operable to isolate communications to the processing unit.

Figure 8:
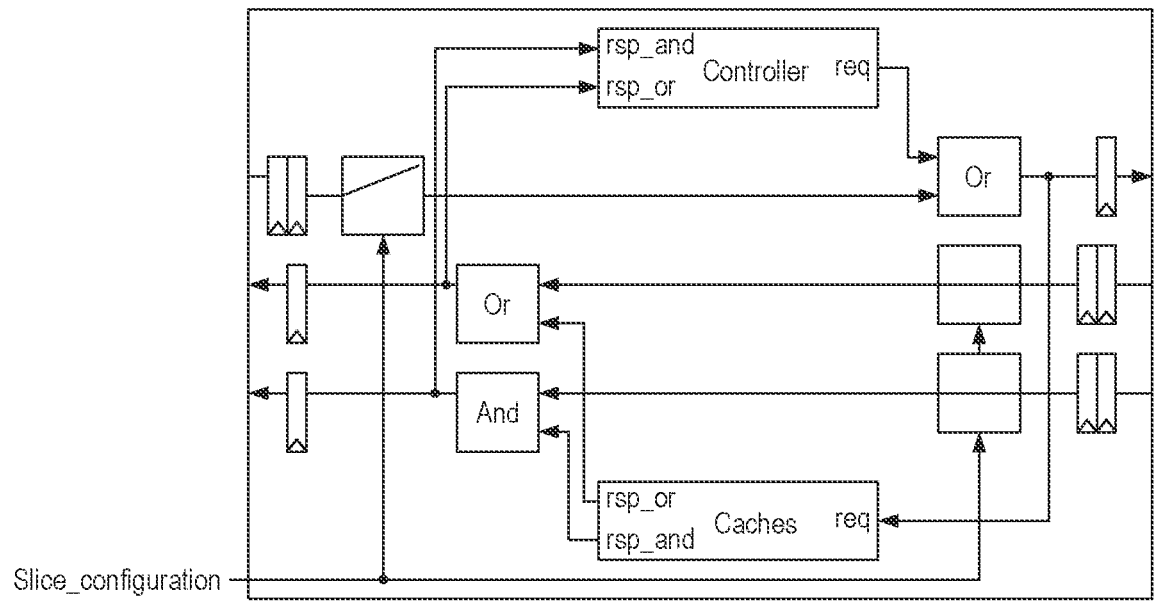
FIG. 8 shows the configuration of the communication network for the processing unit when the processing unit is configured as the master processing unit for the partition of plural processing units in FIG. 6.
Figure 9:
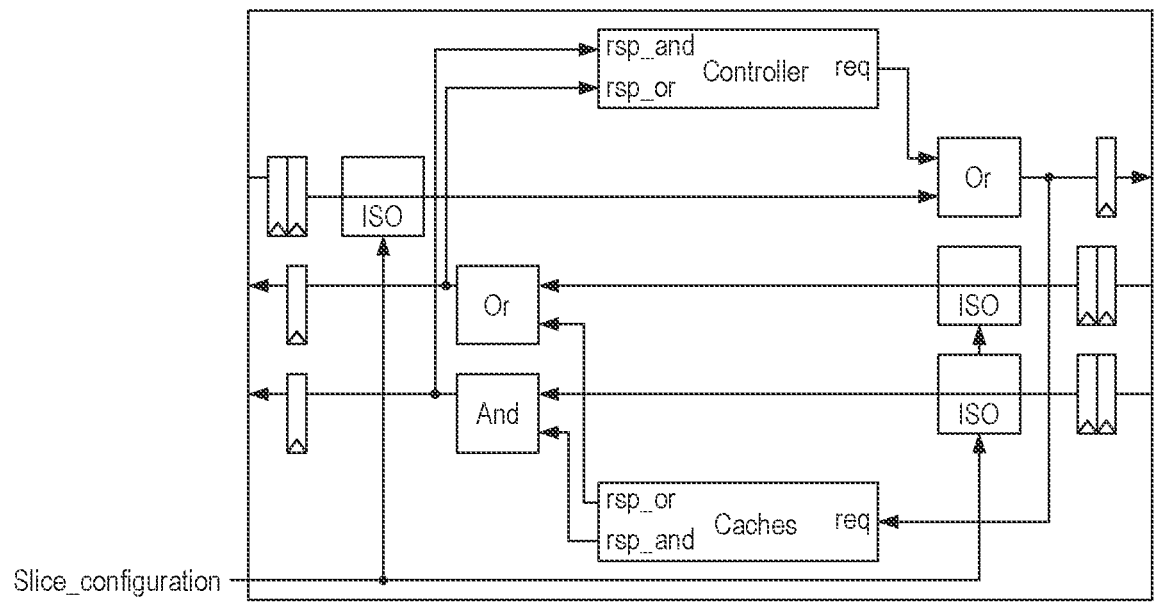
FIG. 9 shows the configuration of the communication network for the processing unit when the processing unit is configured as an intermediate processing unit for the partition of plural processing units in FIG. 6.
Figure 10:
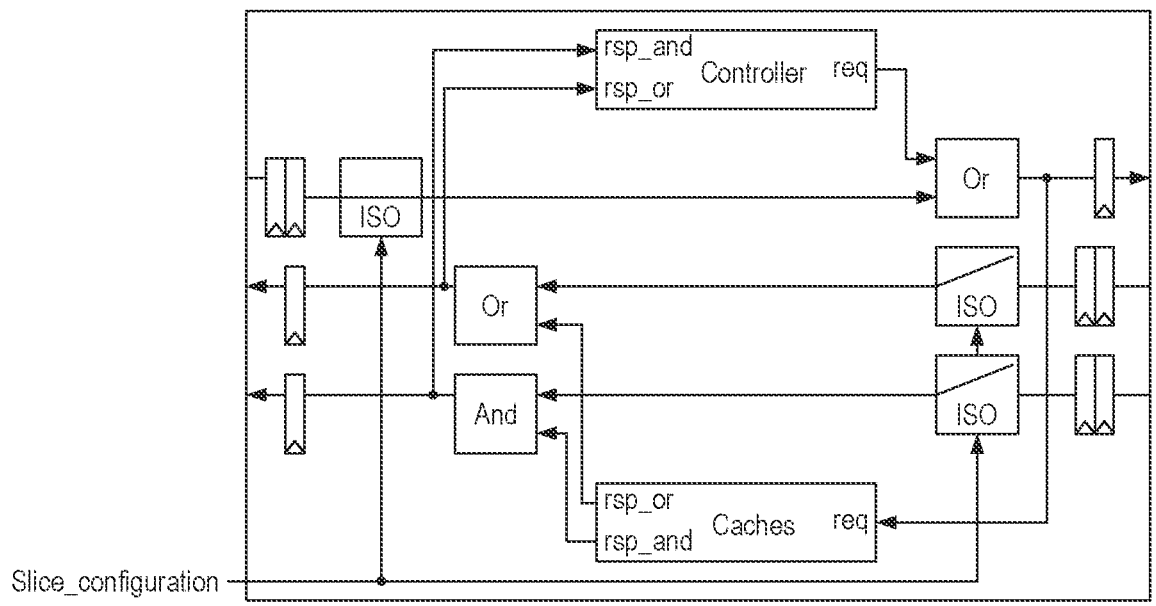
FIG. 10 shows the configuration of the communication network for the processing unit when the processing unit is configured as the final slave processing unit for the partition of plural processing units in FIG. 6.

Thus, as shown in FIG. 8, when the processing unit is configured as a master processing unit, the isolation switch 70 on the left hand side may be set to isolate the corresponding network communication interface (since no communications should be received from that side). Correspondingly, as shown in FIG. 10, when the processing unit is configured as the final slave processing unit in the partition, the isolation switch 70 on the right hand side may be set to isolate the corresponding network communication interface (since no communications should be received from that side). On the other hand, as shown in FIG. 9, any intermediate slave processing units in the partition should be open to communications from both sides, and the isolation switches 70 are set accordingly.

In this way, the processing units can be flexibly configured for different logical arrangements of processing units (for different partitions). For instance, in the example above, each of the processing units is substantially identical, but can be configured appropriately by setting the relevant isolation switches 70 depending on the position of the processing unit within the partition.

The present embodiment is particularly concerned with facilitating multicast cache communications from the designated master cache controller to all of the caches (e.g. TLBs) within the partition at the same time. For instance, in the example of FIG. 6, only the cache controller (MMU) of the master processing unit 60 is active, whereas the cache controllers (MMU) for all of the slave processing units 62 . . . 64 are inactive. However, the caches (e.g. TLBs 534) for all of the processing units in the partition may be active. The master cache controller should therefore be able to communicate with all of the caches within the partition.

Thus, FIG. 7 also shows schematically the controller (MMU) 72 for the processing unit as well as the set of caches 74 (e.g. TLBs 534) that reside on the processing unit. The graphics processing unit also contains associated AND logic 76 and OR logic 78 that is operable to combine cache response signals from the set of caches 74 that reside on the processing unit with corresponding combined cache response signals from the previous, adjacent processing unit in the partition, as will be explained further below.

Figure 11:
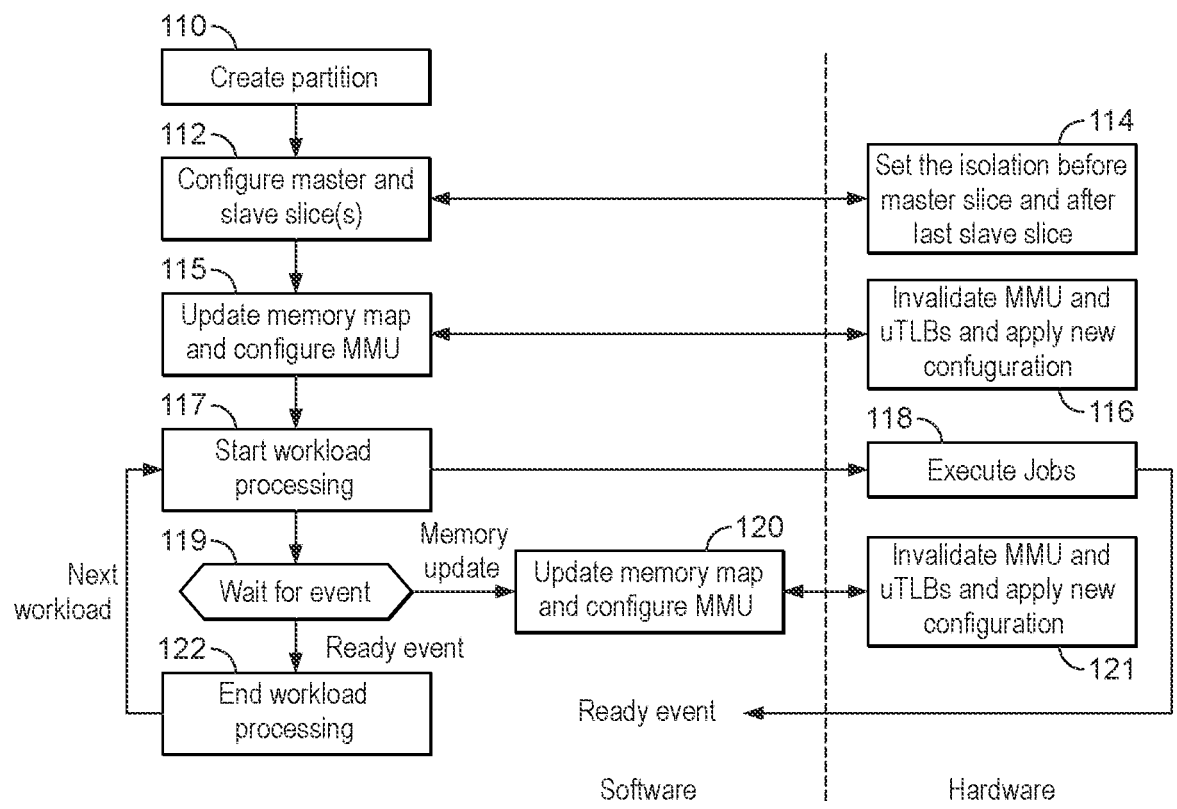
FIG. 11 is a flow chart illustrating an embodiment.

FIG. 11 is a flow chart illustrating the present embodiment. In a first step (step 110), the software prepares a partition of processing units, e.g. in the manner described above. In particular, the software configure a first processing unit as a master processing unit, and configures one or more other processing units as slave processing units that will be operated under the control of the master processing unit (step 112).

As part of this operation, the hardware sets the partition boundaries which will be used for the multicast cache communications appropriately, e.g. by setting the isolation switches in the manner described above (step 114).

Before workload processing is started, the memory mapping is done and the MMU (the master cache controller) is configured accordingly (step 115). To do this, the software writes the page tables in the memory and configures MMU to use the page tables. The hardware then initialises the TLBs and applies the new configuration, e.g. by simultaneously invaliding the TLBs to clear any current cache content (translations that may relate to a previous configuration) (step 116).

Workload processing can then be started (step 117). For example, the software may first write a pointer to the start of a job chain to cause the hardware to start executing the job chain (step 118). The software then waits (step 119) until an interrupt (Job Ready event) is signalled. Work processing is ended when interrupt (Job Ready event) is signalled (step 122).

During the processing, there may be a "memory update request". This request can be, for example, initiated by the hardware, e.g. if there is a memory allocation fault (e.g. no page mapped). This could be the case, for instance, where a heap of (software) allocated memory has run out, such that the allocated memory needs to be increased. Or, a memory update request could be initiated by the software, e.g. for another (the next) workload (e.g. software preparing memory for the next frame or for another application to be executed soon). Various arrangements would be possible in this regard.

When a memory update request is signalled, the software should then update the memory mappings appropriately and re-configure the MMU (step 120). At the same time, the hardware should invalidate the MMU and TLBs for the new configuration (step 121). To do this, the master MMU should transmit a cache invalidation request to all of the TLBs within the partition.

Figure 12:
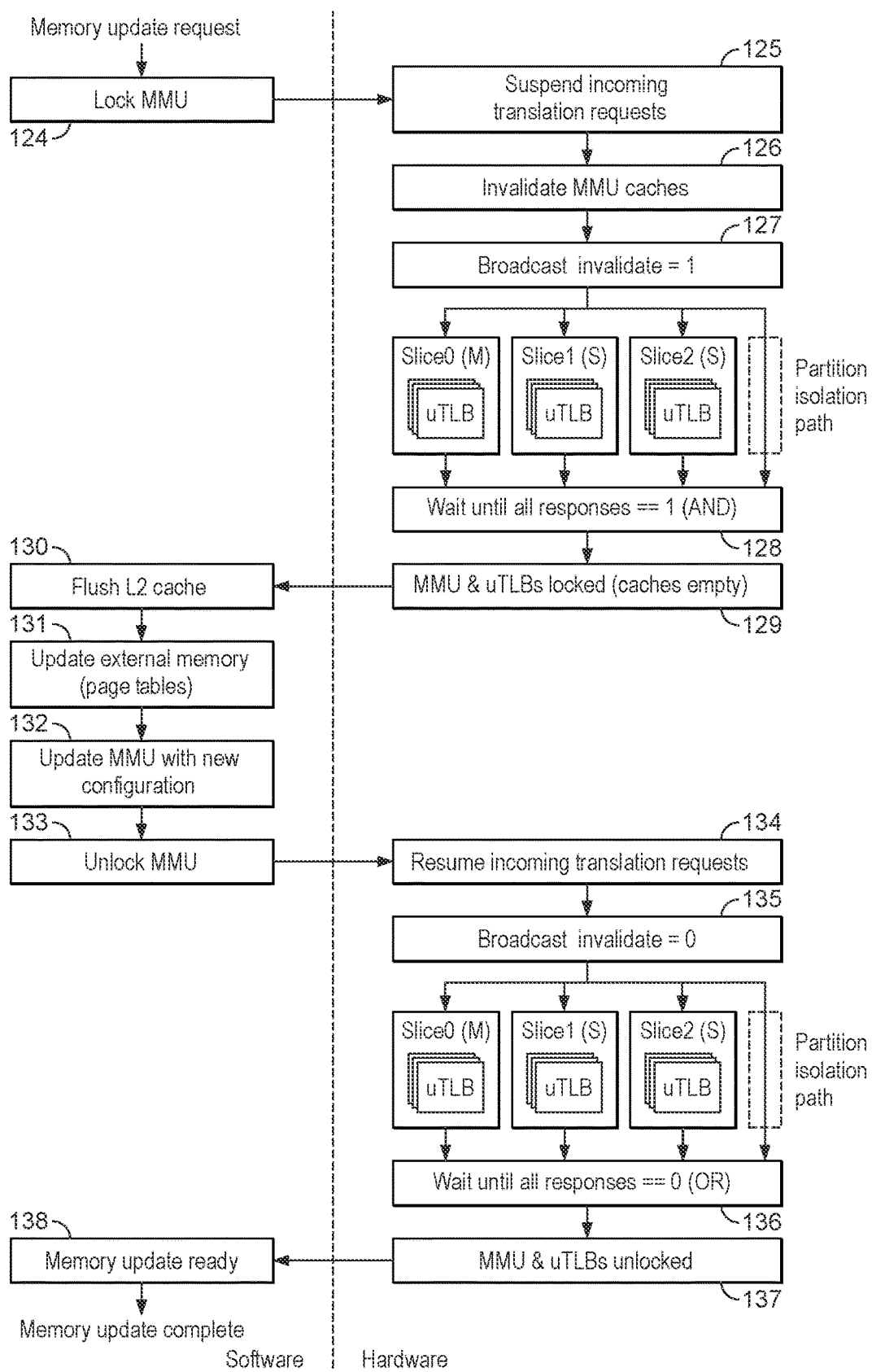
FIG. 12 is a flow chart illustrating in more detail how a cache invalidation request can be handled according to an embodiment.

FIG. 12 shows in more detail how such memory update requests can be handled according to an embodiment (FIG. 12 thus illustrates in more detail steps 115, 116, 120 and 121 in FIG. 11). Thus, as shown in FIG. 12, when a memory update request is received, the protocol is as follows.

The first step by software is to lock (stop) the MMU address translation for an address space (there may be multiple address spaces and each can be configured separately) (step 124).

Locking means that all TLBs and MMU will stop translating virtual addresses to physical. The lock is needed to ensure that memory can be updated safely, e.g., to add new page table entries and/or to modify (move/remove) physical memory.

The software thus issues a lock request signal. In response to this, the hardware (MMU) blocks the input translation request buffer (translation is stopped) (step 125) such that no new translation requests from any of the TLBs in the partition can be processed.

The hardware (MMU) clears all translated entries from the MMU cache (step 126) and then broadcasts to all of the TLBs in the partition a cache invalidation request signal (e.g. by setting the cache invalidation request signal line high (to '1')), which will invalidate all translated entries from the TLBs and leave them locked (not translating any incoming virtual addresses; blocking the input transaction interface) (step 127).

In the present embodiment, the cache invalidation request travels through all the slices in the configured partition in sequence (and the partition boundary (isolation) will pass through the request directly to the response without letting it to travel any slices outside the partition).

The MMU then first waits until all responses are being set high with an "AND gate tree". To facilitate this, as shown in FIG. 7, each processing unit has associated AND logic 76 that is operable to combine respective responses from all of its caches 74 with a combined response signal received from the adjacent, previous processing unit in the partition.

The AND signal received at the master processing unit will thus be set high (only) when all of the TLBs for all of the processing units to which the signal was transmitted are responding. At this point the MMU determines that the cache invalidation request has been received by all of the TLBs, and signals "lock ready" back to software (step 129).

When the MMU is locked (for an address space) the L2 cache (and any other caches using translated physical addresses) is flushed (with invalidation) to ensure that the external memory is up to date and there is no physically addressed cached data in the GPU (step 130). The external memory can now be safely modified (step 131). For example, the page tables (with new memory mapping) can be written and modified. Similarly, physical memory regions can be deleted, added, or moved.

After the external memory is updated, the software configures the MMU (with register writes) with a pointer to the update page tables (step 132). At this point the software can unlock the MMU and start the unlocking routine to allow the system to resume to normal operation (step 133).

This is signalled accordingly and the hardware (MMU) enables the input translation request buffer (translation is enabled) (step 134).

The hardware (MMU) can then de-assert the cache invalidation request (e.g. by setting the cache invalidation request signal line low) in order to remove the locks from the TLBs and allow them to translate virtual addresses to physical again (step 135). The "Invalidate off" request travels through all the slices in the configured partition.

The MMU waits until all responses are being set low with an "OR gate tree", at which point it is determined that all of the TLBs have received the request. To facilitate this, the as shown in FIG. 7, each processing unit has associated OR logic 78 that is operable to combine respective responses from all of its caches 74 with a combined response signal received from the adjacent, previous processing unit in the partition. Thus, after the request has been de-asserted, the de-asserted signal is transmitted to all of the caches, and the respective cache response signals are correspondingly de-asserted when the cache receives the de-asserted request. Once the request has been de-asserted for all of the caches, the request is finished, and processing can safely resume, such that the caches can be unlocked. The MMU signals "unlock ready" back to software (step 137) and the memory update is complete (step 138).

Figure 13:
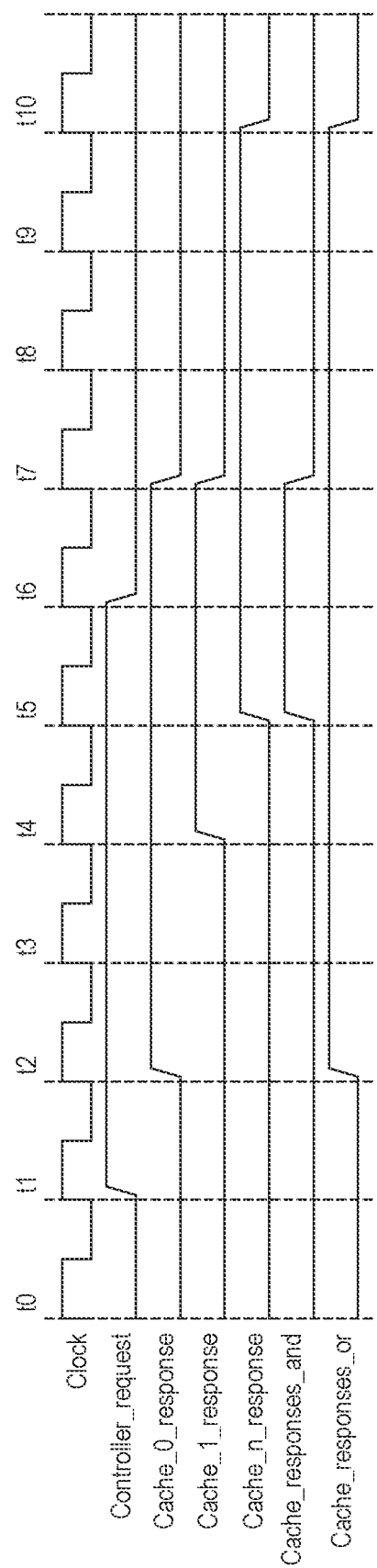
FIG. 13 shows schematically the multicast cache communication protocol according to an embodiment.

FIG. 13 is a timing diagram showing the overall multicast cache communication handshaking protocol according to the present embodiment over a number of clock cycles t0 . . . t10. The handshaking protocol is as follows.

Firstly, the master cache controller broadcasts the request to all caches in the system, by setting the request signal to high (at t1).

The request signal is transmitted to all of the caches in the system over the multicast cache communication network for the partition (such that the request is transmitted along the graphics processing units in sequence). When a cache receives the asserted request signal, the cache responds to the request by setting their respective invalidation response line to high.

For example, FIG. 13 shows a first cache that responds at t2 (cache_0_response) and a second cache that responds at t4 (cache_1_response).

The response signals from the caches are cumulated by the 'AND' and 'OR' logic on each of the graphics processing units within the partition as described above to thereby generate combined 'AND' and OR' response signals that are provided back to the master cache controller. The positive edge on the 'AND' signal thus signifies to the controller that all caches have now seen the request. The controller waits until the AND signal is set before the request is de-asserted. In this way, it can be ensured that all of the caches within the partition have received the request.

Once the request has been received by all of the caches, the controller can then de-assert the request (at t6). The negative edge of the 'OR' signal signifies that all of the caches have finished the request such that the request-response handshake between the controller and the caches is complete. The controller can now initiate next request, if needed.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A data processing system comprising:
a plurality of processing units that are configurable as different, respective partitions of processing units, with each partition comprising a set of one or more of the processing units of the plurality of processing units, wherein at least some of the plurality of processing units include one or more caches and a respective cache controller; and
a configurable multicast communication network for routing cache communications to and from plural caches within respective partitions of processing units,
wherein the multicast communication network is configurable such that a cache controller of one of the processing units within a respective partition of plural processing units can be configured as a master cache controller for a set of plural caches within the partition,
wherein the master cache controller is operable to issue requests over the multicast communication network to all of the caches in the set of plural caches within the partition at the same time, and
wherein the multicast communication network is configured to combine respective responses from all of the caches to which a request was issued from a processing unit in the partition to generate a respective response signal for the processing unit,
the multicast communication network being further configured to combine respective response signals from different processing units within the partition and to provide a combined response signal to the master cache controller that represents an overall request-response status for all of the caches in the set of plural caches to which the request was issued.

2. The data processing system of claim 1, wherein the multicast communication network is arranged such that cache communications are routed to and from processing units in a partition of plural processing units in sequence, such that each processing unit in the partition receives signals from an adjacent processing unit in the sequence.

3. The data processing system of claim 2, wherein the multicast communication network is configured, for each processing unit in the sequence of processing units, to combine respective responses to the request from all of the caches from the processing unit to which the request was issued with a corresponding combined response signal provided by the previous, adjacent processing unit in the sequence to thereby generate an overall combined response signal representing an overall request-response status for all of the caches in the processing unit as well as in any previous processing units in the sequence, the overall combined response signal then being provided to the next, adjacent processing unit in the sequence.

4. The data processing system of claim 3, wherein each processing unit has associated first logic for generating a first combined response signal indicating whether or not all of the caches in the set of plural caches to which the request was issued are currently responding to the request.

5. The data processing system of claim 4, wherein each processing unit has associated second logic for generating a first combined response signal indicating whether or not any of the caches in the set of plural caches to which the request was issued are currently responding to the request.

6. The data processing system of claim 5, wherein the master cache controller is configured to determine from the first and/or second combined response signals a current overall request-response status for all of the caches in the set of plural caches to which the request was issued, the overall request-response status being one or more of: (i) none of the caches in the set of plural caches to which the request was issued have received the request; (ii) at least some of the caches in the set of plural caches to which the request was issued have received the request; (iii) all of the caches in the set of plural caches to which the request was issued have received the request; (iv) at least some of the caches in the set of plural caches to which the request was issued have finished the request; and (v) all of the caches in the set of plural caches to which the request was issued have finished the request.

7. The data processing system of claim 1, wherein the request that is issued by the master cache controller to the set of plural caches within the partition is a request to clean and/or invalidate all of the caches in the set of plural caches, or wherein the request comprises a memory barrier.

8. The data processing system of claim 1, wherein the set of plural caches that the master cache controller is operable to issue requests to using the multicast communication network comprises a set of address translation caches, and wherein the master cache controller comprises a respective memory management unit.

9. The data processing system of claim 1, wherein the communication network is re-configurable for different partitions of processing units to allow cache controllers of different processing units within the group to be configured as the master cache controller for different respective partitions.

10. The data processing system of claim 9, wherein each processing unit includes one or more network interfaces for communications from adjacent processing units in the partition, and wherein each processing unit further includes a set of one or more isolation switches that can be set to isolate communications from a respective network interface to configure the communication network.

11. A method of operating a data processing system, the data processing system comprising:
a plurality of processing units that are configurable as different, respective partitions of processing units, with each partition comprising a set of one or more of the processing units of the plurality of processing units, wherein at least some of the plurality of processing units include one or more caches and a respective cache controller;
wherein a multicast communication network is provided for routing cache communications to and from plural caches within a partition of processing units, the multicast communication network being configured such that a cache controller of one of the processing units within a partition can be configured as a "master" cache controller for a set of plural caches within the partition:

the method comprising:

for a respective partition of plural processing units:

a master cache controller for the partition issuing a request over the multicast communication network to all of the caches in the set of plural caches within the partition at the same time;

the multicast communication network combining respective responses from all of the caches to which a request was issued from a processing unit in the partition to generate a respective response signal for the processing unit;

the multicast communication network further combining respective response signals from different processing units within the partition and providing a combined response signal to the master cache controller; and the master cache controller determining using the combined response signal an overall request-response status for all of the caches in the set of plural caches to which the request was issued.

12. The method of claim 11, comprising routing cache communications to and from processing units in a partition of plural processing units in sequence such that each processing unit in the partition receives signals from an adjacent processing unit in the sequence.

13. The method of claim 12, comprising, for each processing unit in the sequence of processing units, combining respective responses to the request from all of the caches from the processing unit to which the request was issued with a corresponding combined response signal provided by the previous, adjacent processing unit in the sequence to thereby generate an overall combined response signal representing an overall request-response status for all of the caches in the processing unit as well as in any previous processing units in the sequence, and then providing the overall combined response signal to the next, adjacent processing unit in the sequence.

14. The method of claim 13, wherein each processing unit has associated first logic for generating a first combined response signal indicating whether or not all of the caches in the set of plural caches to which the request was issued are currently responding to the request.

15. The method of claim 14, wherein each processing unit has associated second logic for generating a first combined response signal indicating whether or not any of the caches in the set of plural caches to which the request was issued are currently responding to the request.

16. The method of claim 15, comprising the master cache determining from the first and/or second combined response signals a current overall request-response status for all of the caches in the set of plural caches to which the request was issued, the overall request-response status being one or more of: (i) none of the caches in the set of plural caches to which the request was issued have received the request; (ii) at least some of the caches in the set of plural caches to which the request was issued have received the request; (iii) all of the caches in the set of plural caches to which the request was issued have received the request; (iv) at least some of the caches in the set of plural caches to which the request was issued have finished the request; and (v) all of the caches in the set of plural caches to which the request was issued have finished the request.

17. The method of claim 11, wherein the request that is issued by the master cache controller to the set of plural caches within the partition is a request to clean and/or invalidate all of the caches in the set of plural caches, or wherein the request comprises a memory barrier.

18. The method of claim 11, wherein the set of plural caches that the master cache controller is operable to issue requests to using the multicast communication network comprises a set of address translation caches, and wherein the master cache controller comprises a respective memory management unit.

19. The method of claim 11, wherein each processing unit includes one or more network interfaces for communications from adjacent processing units in the partition, and wherein each processing unit further includes a set of one or more isolation switches that can be set to isolate communications from a respective network interface, the method comprising: configuring the communication network for the partition of processing units by setting one or more of the isolation switches for the processing units in the partition according to the logical arrangement of the processing units within the partition.

20. A computer program comprising computer software code that when run on one or more data processors will perform a method of operating a data processing system, the data processing system comprising:

a plurality of processing units that are configurable as different, respective partitions of processing units, with each partition comprising a set of one or more of the processing units of the plurality of processing units, wherein at least some of the plurality of processing units include one or more caches and a respective cache controller;

wherein a multicast communication network is provided for routing cache communications to and from plural caches within a partition of processing units, the multicast communication network being configured such that a cache controller of one of the processing units within a partition can be configured as a "master" cache controller for a set of plural caches within the partition:

the method comprising:

for a respective partition of plural processing units:

a master cache controller for the partition issuing a request over the multicast communication network to all of the caches in the set of plural caches within the partition at the same time;

the multicast communication network combining respective responses from all of the caches to which a request was issued from a processing unit in the partition to generate a respective response signal for the processing unit;

the multicast communication network further combining respective response signals from different processing units within the partition and providing a combined response signal to the master cache controller; and the master cache controller determining using the combined response signal an overall request-response status for all of the caches in the set of plural caches to which the request was issued.

* * * * *